United States Patent [19]

Melsa et al.

[11] Patent Number: 6,108,349
[45] Date of Patent: Aug. 22, 2000

[54] METHOD AND APPARATUS FOR REGISTERING REMOTE SERVICE UNITS IN A MULTIPOINT COMMUNICATION SYSTEM

[75] Inventors: Peter J. W. Melsa, McKinney, Tex.; Mark Patton, Mishawaka, Ind.; Daniel J. Marchok, Buchanan, Mich.; Richard C. Younce, Bolingbrook, Ill.

[73] Assignee: Tellabs Operations, Inc., Lisle, Ill.

[21] Appl. No.: 09/126,803

[22] Filed: Jul. 31, 1998

Related U.S. Application Data

[63] Continuation-in-part of application No. 08/700,779, Aug. 22, 1996, Pat. No. 5,790,514.

[51] Int. Cl.[7] .................................................. H04J 3/16
[52] U.S. Cl. .................................................... 370/465
[58] Field of Search ..................................... 370/465, 503, 370/350, 474, 476, 479, 480, 342, 347, 441, 442, 464, 341, 343, 337, 335, 206, 208, 210, 320, 321, 319, 330, 318, 405; 375/200, 354, 355, 356, 359, 362, 298, 261, 140, 145

[56] References Cited

U.S. PATENT DOCUMENTS

| | | | |
|---|---|---|---|
| 5,206,886 | 4/1993 | Bingham | 375/97 |
| 5,228,025 | 7/1993 | Le Floch et al. | 370/20 |
| 5,539,777 | 7/1996 | Grube et al. | 375/316 |
| 5,602,835 | 2/1997 | Seki et al. | 370/206 |
| 5,603,081 | 2/1997 | Raith et al. | 455/33.1 |
| 5,608,725 | 3/1997 | Grube et al. | 370/338 |
| 5,790,514 | 8/1998 | Marchok et al. | 370/208 |

OTHER PUBLICATIONS

Bingham, "Multicarrier Modulation for Data Transmission: An Idea Whose Time Has Come," *IEEE Communication Magazine*, pp. 5–14 (May, 1990).

Cablespan™ 2300, Cablespan™ Training Presentations, Tellabs, pp: 1–17 (1996).

Jacobsen, et al., "Synchronized DMT for Multipoint-to-point Communication on HFC Networks," *Information Systems Laboratory, IEEE Global Telecommunications Conference in Singaport.* pp. 1–10 (Nov., 1995).

Whittle, "The Optus Vision: Telephone, Internet and Video," *Australian Communications*, 7 pages (Aug., 1996).

*Primary Examiner*—Dang Ton
*Attorney, Agent, or Firm*—McAndrews, Held & Malloy, Ltd.

[57] ABSTRACT

A method and apparatus are provided for registering (unsynchronized) remote units with a multipoint communications system. An upstream multi-access channel (UMAC) is defined, over which non-registered remote units may transmit registration requests and related data. Non-registered remote units may transmit over the UMAC channel at any time independent of upstream transmissions from other remote units already registered with the network. To effect registration, the non-registered remote unit transmits a standardized asynchronous transmission sequence (ATS) signal over the UMAC channel. The ATS signal is "standardized" as it contains a predefined leading segment, the format for which is known to the head end unit. The ATS signal also contains a data segment that may be unique to the remote unit (e.g., it may uniquely identify the remote unit and/or request registration). The head end unit continuously monitors the UMAC channel and identifies an incoming ATS signal when it detects a predetermined sequence of amplitude and/or phase shifts in the incoming signal over the UMAC channel. The head end unit synchronizes the ATS signal therewith by identifying a reference point in the ATS signal based on known amplitude and/or phase shift(s) in the incoming signal. Once the ATS signal is synchronized, the head end unit obtains the data segment therefrom and registers the requesting remote unit.

40 Claims, 20 Drawing Sheets

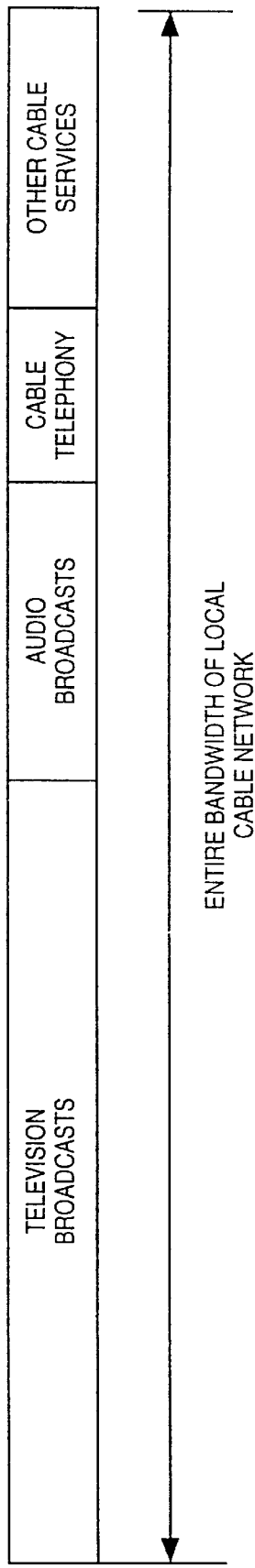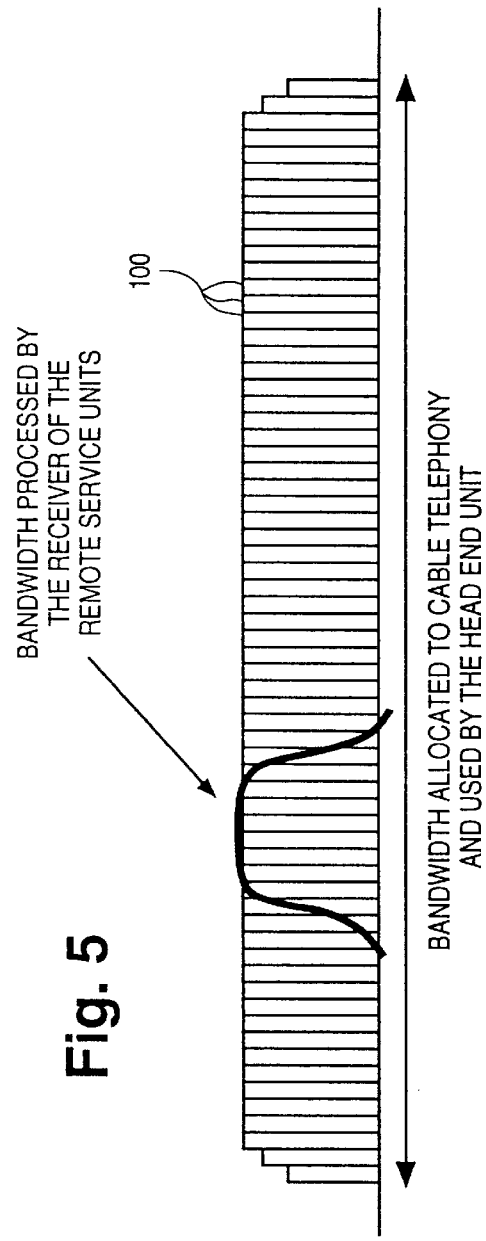

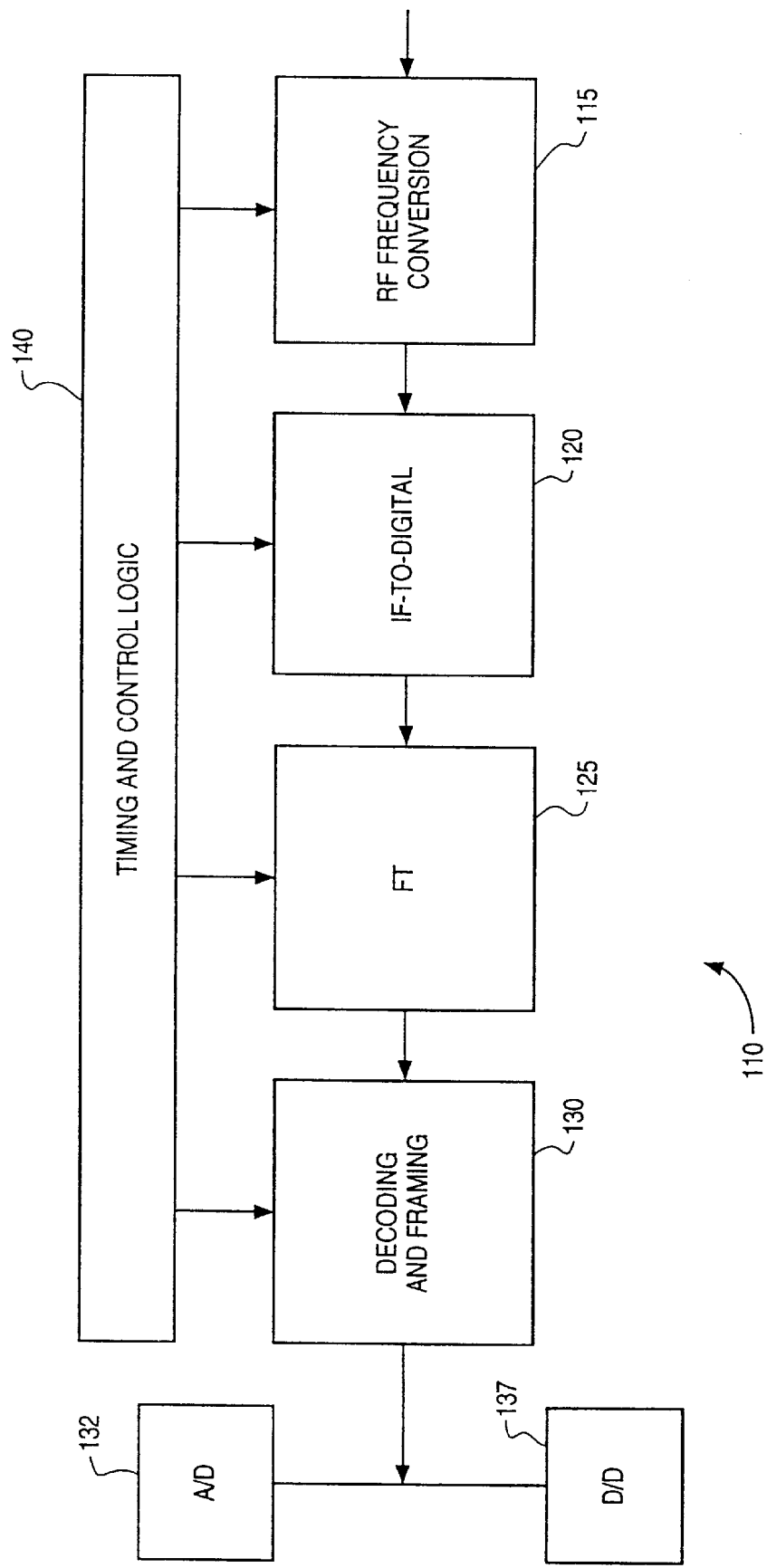

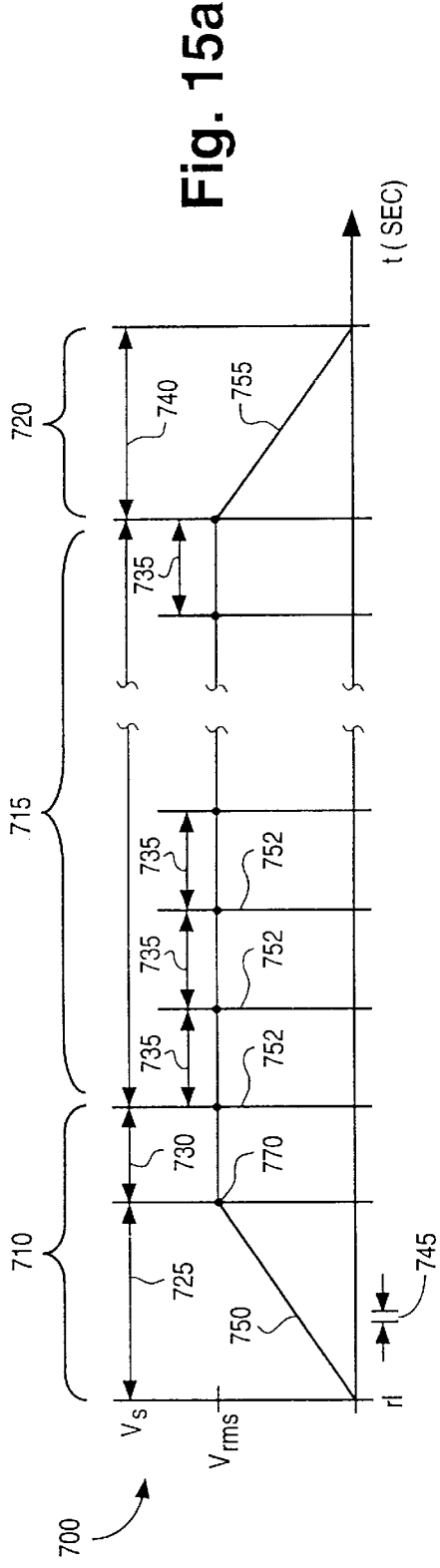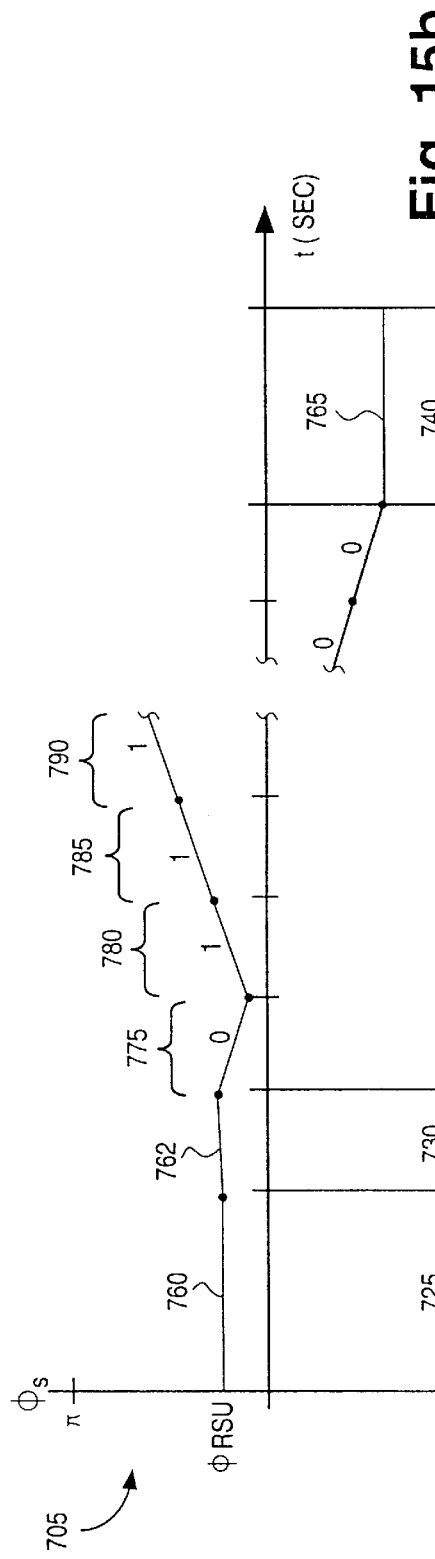

THE MAXIMUM LIKELIHOOD (ML) KNEE-ESTIMATOR PROCESSOR AT THE MRF.

THE BLOCK-BY-BLOCK COHERENT MAXIMUM LIKELIHOOD (ML) DECODER

METHOD AND APPARATUS FOR REGISTERING REMOTE SERVICE UNITS IN A MULTIPOINT COMMUNICATION SYSTEM

CROSS-REFERENCE TO RELATED APPLICATIONS

The present application is a continuation-in-part application of application Ser. No. 08/700,779, now U.S. Pat. No. 5,790,514, filed on Aug. 22, 1996. The patent application Ser. No. 08/700,779, now U.S. Pat. No. 5,790,514, is incorporated in its entirety herein by reference.

BACKGROUND OF THE INVENTION

Multi-point communications systems having a primary site that is coupled for communication with a plurality of secondary sites are known. One such communication system type is a cable telephony system. Cable telephony systems transmit and receive telephone call communications over the same cable transmission media as used to receive cable television signals and other cable services.

One cable telephony system currently deployed and in commercial use is the Cablespan 2300 system available from Tellabs, Inc. The Cablespan 2300 system uses a head end unit that includes a primary transmitter and primary remote disposed at a primary site. The head end unit transmits and receives telephony data to and from a plurality of remote service units that are located at respective secondary sites. This communication scheme uses TDM QPSK modulation for the data communications and can accommodate approximately thirty phone calls within the 1.9 MHz bandwidth typically allocated for such communications.

As the number of cable telephony subscribers increases over time, the increased use will strain the limited bandwidth allocated to the cable telephony system. Generally stated, there are two potential solutions to this bandwidth allocation problem that may be used separately or in conjunction with one another. First, the bandwidth allocated to cable telephony communications may be increased. Second, the available bandwidth may be used more efficiently. It is often impractical to increase the bandwidth allocated to the cable telephony system given the competition between services for the total bandwidth assigned to the cable service provider. Therefore, it is preferable to use the allocated bandwidth in a more efficient manner. One way in which the allocated bandwidth may be used more efficiently is to use a modulation scheme that is capable of transmitting more information within a given bandwidth than the TDM QPSK modulation scheme presently employed.

The present inventors have recognized that OFDM/DMT modulation schemes may provide such an increase in transmitted information for a given bandwidth. U.S. Pat. No. 5,539,777, issued Jul. 23, 1996, purports to disclose a DMT modulation scheme for use in a communications system. The system principally focuses on applications in which a single secondary site includes a plurality of differing remote and transmitter devices. The transmitters and remotes used at the secondary site of the system described therein, however, are quite complex and require a substantial amount of processing power. As such, the system disclosed in the '777 patent does not readily or economically lend itself to multi-point communications systems in which there are a large number of secondary sites each having at least one remote.

Another concern with multipoint communications systems relates to the establishment of communications from a particular remote service unit to the head end unit receiver (up-stream). Prior to communication, the remote unit is not registered or synchronized over any upstream channel. In the past, if an unsynchronized, unregistered remote unit attempted to transmit in the upstream direction while other remote units were transmitting in the upstream direction, the unsynchronized remote unit would disrupt in-progress data transmissions with the other remote units.

Past systems have addressed this problem in the manner described in a paper entitled "Synchronized DMT for Multipoint-to-Point Communications on HFC Networks", by Jacobsen et al., 1995, published at the November, 1995 IEE Global Telecommunications Conference in Singaport. The Jacobsen et al. paper explains the conventional approach to synchronize discrete multi-tone data (DMT) for multipoint to point communications as follows. The network defines a silent interval in every upstream channel from the remote units. The silent interval has a predetermined length and is observed periodically by all synchronized remote units presently registered with the network. The unsynchronized remote units seeking to register with the network were only permitted to transmit upstream during the silent interval, at which time they requested an upstream channel assignment (e.g., they transmitted an installation signal). Once the head end unit received the request, it and the remote unit performed synchronization operations. The head end unit also registered the remote unit at that time. The duration of the silent interval was required to exceed at least the maximum round-trip signal delay over all remote units plus the time required to actually transmit the installation information. However, the foregoing conventional approach to upstream synchronization has drawbacks. For instance, the conventional approach requires that all remote units cease transmitting upstream during the silent interval, thereby substantially reducing the available upstream transmission capacity.

Therefore, a need remains for an improved upstream registration/synchronization method and apparatus.

BRIEF SUMMARY OF THE INVENTION

An OFDM/DMT multi-point communications system is set forth that is particularly useful in communications applications in which there are a number of remote secondary sites each requiring at least one remote. The communications system comprises a primary transmitter disposed at a primary site and a plurality of remotes respectively disposed at a plurality of secondary sites. The primary transmitter generates an OFDM/DMT signal to transmit communication data in a number of transmission bins. A transmission medium is used for transmitting the OFDM/DMT signal from the primary transmitter at the primary site to the plurality of remotes disposed at a plurality of secondary sites. Each of the plurality of remotes employs a unique architecture that digitally processes an exclusive subset of the original set of bins transmitted by the primary transmitter. This recovers the communication data that is transmitted in the exclusive subset of the original set of bins. Such a remote architecture eliminates much of the complexity typically associated with receiving and processing a wide-band OFDM/DMT signal, thereby making the communications system subject to economical and practical implementation in applications having remotes respectively located at a large number of secondary sites.

Each of the plurality of remotes may comprise a first circuit for converting the analog OFDM/DMT transmissions received from the transmitter of the primary site into digital data and a second circuit for processing the digital data output of the first circuit to extract frequency, amplitude, and phase information from the digital data. A third circuit is provided for limiting the digital data processed by the second circuit to a second number of transmission bins, the second number of transmission bins being a subset of the first number of transmission bins transmitted by the transmitter of the primary site.

The third circuit referenced above may be constructed in several ways. For example, the third circuit may comprise an analog-to-digital converter disposed in the first circuit for converting the analog OFDM/DMT transmissions to the digital data at a sampling frequency which results in aliasing of the digital data characteristics to thereby reduce the number of digital data samples processed by the second circuit. As a further example, the third circuit may comprise a band pass filter disposed in the first circuit for limiting the number of bins that are converted to generate the digital data to a subset of the first number of bins of the OFDM/DMT transmissions. Without limitation, one or both of these data reduction techniques can be employed within a single remote.

According to another aspect of the present invention, a method and apparatus are provided for registering (unsynchronized) remote units with the primary transmitter at the primary site. An upstream multi-access channel (UMAC) is defined, on one or more bins of the upstream OFDM/DMT signal to be received by the primary site. Non-registered remote units may transmit registration requests and related data over the UMAC channel. Non-registered remote units may transmit over the UMAC channel at anytime independent of upstream transmissions from other remote units already registered within the network. All non-registered remote units may utilize a common UMAC channel. To effect registration, the non-registered remote unit transmits a standard asynchronous transmission sequence (ATS) over the UMAC channel. The ATS signal contains a predefined leading segment, the format for which is known to the head end unit. The ATS signal also contains a data segment that may be unique to the remote unit (e.g., it may uniquely identify the remote unit and/or request registration). The head end unit continuously monitors the UMAC channel and identifies an incoming ATS signal when it detects a predetermined sequence of amplitude and/or phase shifts on the incoming signal over the UMAC. The head end unit synchronizes to the ATS signal therewith by identifying a reference point in the ATS signal based on a known amplitude and/or phase shift(s) in the incoming signal. The predefined format of the ATS signal facilitates synchronization. Once synchronized to the ATS signal, the head end unit obtains the data segment therefrom and carries out any additional steps necessary to register the requesting remote unit.

According to one implementation of the present invention, a UMAC is provided that communicates in a non-synchronized, non-orthogonal manner with the head end unit. The UMAC is afforded a narrow bandwidth and must minimize interference with adjacent channels that are synchronized and orthogonal at the head end unit.

BRIEF DESCRIPTION OF THE SEVERAL VIEWS OF THE DRAWING

FIGS. 4 and 5 illustrate exemplary bandwidth allocations for the local cable system and the cable telephony system, respectively.

FIGS. 6–8 illustrate various embodiments of the remote service unit at various levels of detail.

FIGS. 15A and 15B illustrate an exemplary format for the amplitude and phase of an asynchronous transmission sequence (ATS) transmitted over a UMAC as a registration request according to one embodiment of the present invention.

DETAILED DESCRIPTION OF THE INVENTION

Figure 1:
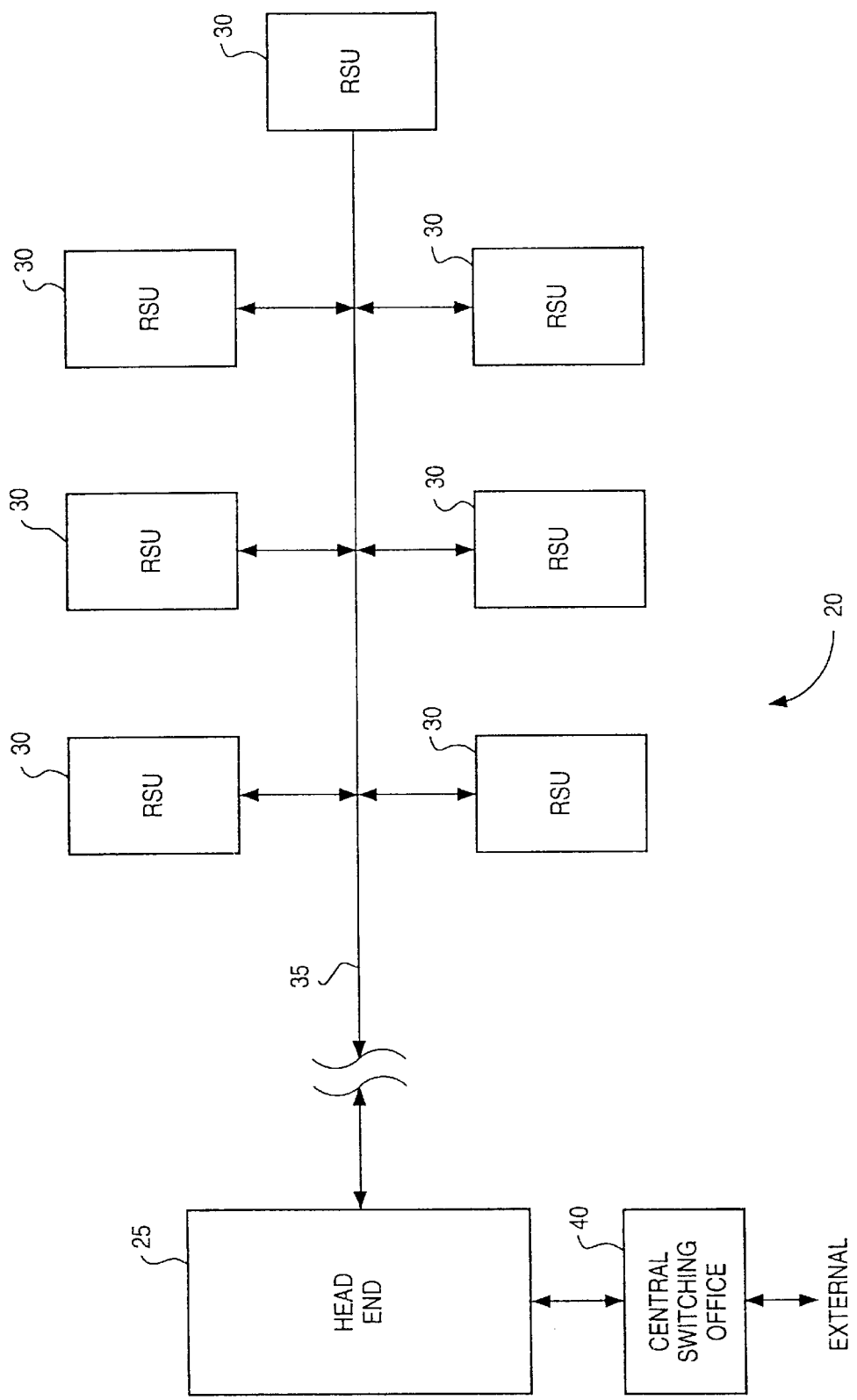
FIG. 1 is a schematic block diagram of a multi-point communications system having a plurality of remote service units disposed at a plurality of secondary sites wherein each of the remote service units comprises a remote having an improved remote architecture.

FIG. 1 is a block diagram of a multi-point communications network which may use a remote service unit having the improved remote and transmitter architectures disclosed herein. As illustrated, the communications system, shown generally at 20 includes a head end unit (HE) 25 disposed at a primary site. The head end unit communicates with a plurality of remote service units (RSUs) 30 respectively disposed at a plurality of secondary sites, over a transmission medium 35 such as a coaxial cable.

The digital communications system 20 may, for example, be a cable telephony system. In such an application, the head end unit 25 is disposed at a cable television transmission facility while the remote service units 30 are disposed at individual customer locations, such as individual customer homes. The transmission medium 35 would be new or existing transmission cable used to transmit the cable television services. The head end unit 25 in a cable telephony network is responsible for communicating with and interconnecting telephone calls between the plurality of remote service units 30 as well communicating with a central switching office 40 for sending and receiving telephone calls from sites exterior to the local cable television service area.

Figure 2:
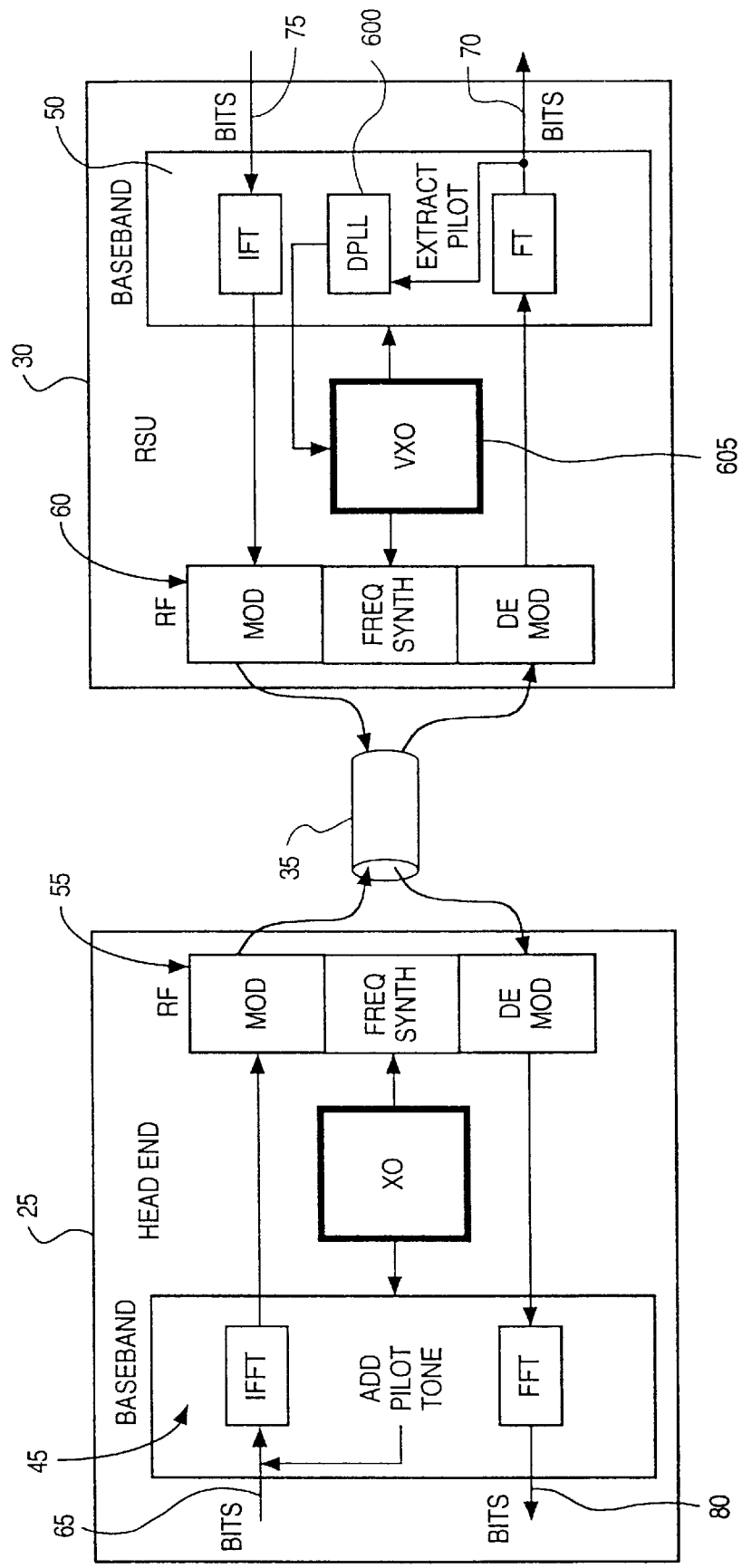
FIG. 2 is a block diagram of illustrative embodiments of the head end unit and a remote service unit of the communications system of FIG. 1.

A block diagram of one embodiment of a head end unit 25 and a remote service unit 30 is shown in FIG. 2. As illustrated, the head end unit 25 and the remote service units 30 each generally compromise respective baseband sections 45, 50 and respective RF sections 55, 60. The baseband section 45 of the head end unit 25 receives constellation data at one or more lines 65 and performs an Inverse Fast Fourier Transform on the received data. The transformed signal is modulated within the RF section 55 for transmission along the cable transmission 35. The remote service units 30 receive the RF modulated data from the cable transmission medium 35 in the respective RF section. The receive signal is demodulated within the RF section 60 of the remote service unit 30 and the resulting signal is supplied to the baseband section 60 which performs a Fourier Transform on the signal to recover the data transmitted by the head end unit 25. The recovered data is supplied from the baseband section 60 along one or more lines 70 for further decoding. As is apparent from the block diagram of FIG. 2, constellation data may also be received at one or more lines 75 of the baseband section 50 of the remote receiving unit 30. The received data undergoes an Inverse Fourier Transformation or, more preferably, a direct sequence transformation and the resulting signal is RF modulated for transmission along the cable transmission medium 35 for receipt by the head end unit 25. The head end unit 25 demodulates the received signal in the RF section 55 and performs a Fast Fourier Transform on the demodulated signal to recover the transmitted data and provide it on one or more lines 80 for further decoding.

Figure 3:
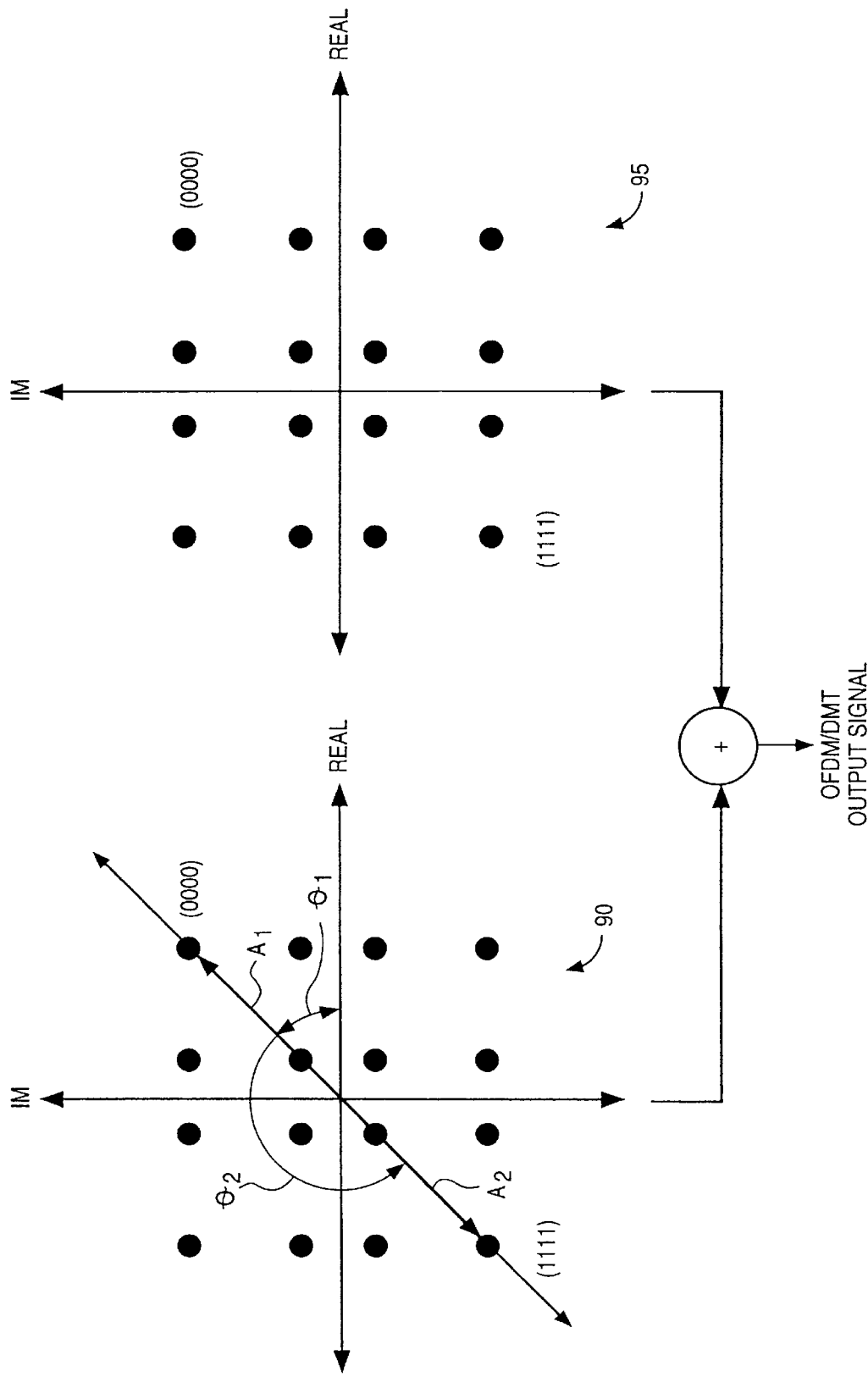
FIG. 3 illustrates two symbol constellations that are transmitted in two separate frequency bins in accordance with OFDM/DMT data modulation techniques.

The present system 20 utilizes OFDM/DMT digital data modulation for exchanging communications data between the head end unit 25 and the remote service units 30. Such OFDM/DMT digital data communications assign a particular amplitude, frequency, and phase for each transmitted "sub-symbol". The transmitted "sub-symbol" represents one or more information data bits that are to be transmitted between the units 25 and 30. Each sub-symbol may be represented by a point within a "constellation", the point being transmitted at a given carrier frequency or "bin". FIG. 3 illustrates the use of two constellations 90 and 95, each having sixteen constellation points that are capable of being transmitted within two separate frequency bins. As illustrated, a sub-symbol having a carrier signal of frequency f1 has its amplitude and phase varied depending on the constellation point that is to be transmitted. For example, a constellation point representing the binary states 0000 is transmitted as a sub-symbol at a phase of $\theta_1$ and an amplitude of $A_1$ during a designated symbol time. A constellation point representing the binary states 1111, however, is transmitted as a sub-symbol at a phase of $\theta_2$ and an amplitude of $A_2$ during a designated symbol time. Similarly, the second constellation 95, preferably having the same amplitude and phase designations for its sub-symbols as the first constellation 90, is used to modulate a second carrier frequency f2. The resulting modulated signals are combined into a single output symbol in which the individual sub-symbols are differentiated from one another based on their respective carrier frequencies or "bins". It will be recognized that may variations of the disclosed OFDM/DMT transmission scheme are possible, the foregoing scheme being merely illustrated herein to provide a basic understanding of OFDM/DMT communications.

Referring to FIG. 4 there is shown an exemplary break-up of the bandwidth allocated to a local cable television service. As illustrated, the entire allocated bandwidth is further sub-allocated into smaller bandwidth portions for the transmission of selected services such as cable television, audio broadcasting, cable telephony, and other miscellaneous services. The bandwidth allocated for cable telephony constitutes the focus of further discussion. However, it will be recognized that the digital communications system described herein can be utilized in any multi-point digital data communications system.

FIG. 5 illustrates the bandwidth allocated, for example, to the cable telephony communications. Without limitation, the bandwidth of the exemplary embodiment may be about 2 MHz with a center frequency of about 600 MHz. As shown, the bandwidth is divided into a plurality of frequency bins 100, each bin carrying a sequence of sub-symbols corresponding to the data that is to be communicated. The head end unit 35 sends and receives data to and from multiple remote service units 30 and must be capable of processing substantially all, if not all of the bins allocated to cable telephony transmission. Such a high amount of processing power naturally gives rise to increased production, maintenance, and power costs. Similarly, the remotes service units 30 require substantial processing power if they are to each process the entire bandwidth or number of bins allocated to the cable telephony communications and transmitted by the head end unit 25.

The present inventors, however, have recognized that many applications using multi-point, OFDM/DMT data communications do not require that the remote service units 30 process the entire number of bins transmitted by the transmitter at the primary site. Rather, as recognized by the present inventors, the remote service units 30 employed in many types of OFDM/DMT data communications systems, such as cable telephony systems, need only be capable of processing a limited number of bins of the entire number of bins transmitted by the head end unit 25.

Based on this recognition, the remote service units 30 are designed to process substantially fewer bins than the entire number of bins transmitted by the head end unit 25. More particularly, the remote architecture of each RSU is particularly adapted to exclusively digitally process only a limited number of bins of the larger number of OFDM/DMT bins that are transmitted by the head end unit 25. Remote service units 30 disposed at different secondary sites are preferably designed to process different subsets of bins. More preferably, the particular subsets of bins processed by any remote service units is dependent on command transmissions received from the head end unit 25.

Such a remote architecture has several advantages. For example, the digital signal processing capability required by the remote of each RSU is significantly reduced thereby making each RSU more economical to design, manufacture, and maintain. Additionally, each RSU consumes less power than would otherwise be required if each RSU had to process the complete number of bins sent by the head end unit 25.

FIG. 6 is a schematic block diagram of one embodiment of a receiver 110 suitable for use in the remote service units 30. As illustrated, the exemplary embodiment is comprised of five functional sections: an RF conversion section 115, an IF-to-digital conversion section 120, a Fourier Transform section 125, a decoding and framing section 130, and a timing and control logic section 140.

The RF conversion section 115 receives the RF signal from the transmission medium 35 through, for example, a splitter, and transposes the desired part of the OFDM/DMT spectrum containing the information that is to be recovered into a predetermined intermediate frequency (IF) pass band. As will be readily recognized, and as will be set forth in further detail below, the RF conversion is achieved with a combination of mixers, filters, and frequency synthesizers.

The IF-to-digital section 120 is used to sample the IF analog signal output of the RF conversion section 115 and provide a digital output signal corresponding to fewer than all of the bins transmitted by the head end unit 25. The resulting digital output signal can thus be processed by the Fourier Transform section 125 using substantially less processing power than would otherwise be required to process the full number of bins. The desired output signal is achieved by band pass filtering the signal to provide a signal that comprises a subset of the original OFDM/DMT bins transmitted by the head end unit 25. This filtered signal is then under-sampled such that the desired signal folds down to near base band via an aliasing process. Under-sampling permits the use of a lower frequency A-to-D conversion than would otherwise be required. Additionally, the under sampling reduces the number of digital samples that are generated, thereby reducing the amount of processing power required in subsequent digital processing steps in the Fourier Transform section 125.

It will be recognized, however, that under sampling is not the only choice for reducing the number of digital samples that are generated to the subsequent sections. For example, a mixer could be used to mix the filtered signal to base band thereby reducing the sampling frequency required to properly sample the received signal. This too would allow one to take advantage of the reduced bin remote to reduce speed, complexity, and power usage of the system.

The Fourier Transform section 125 is used to take the Fourier transform of the sampled signal output from the IF-to-digital section 120 in order to obtain a frequency domain representation of the OFDM/DMT modulated signal. This can be achieved in any one of multiple ways. First, the Fourier Transform section 125 may include a digital signal processor that performs a Fourier Transform on the sampled data. However, unlike ordinary OFDM/DMT digital communications which perform a Fast Fourier Transform over all the bins sent by the transmitter at the primary site, the Fourier Transform implemented by the presently disclosed receiver 110 is taken over a reduced number of bins. This results in significant cost and power savings. A further improvement can be achieved in the case where the sampled signal received from the IF-to-digital section 120 contains more bins than any individual remote needs to receive. In this case, a hardware correlator could be used to obtain a Fourier Transform of only the bin frequencies containing data that the receiver 110 is to recover. This permits further power and complexity reduction when the narrow band receive window is still somewhat larger than the needed bandwidth. Furthermore, this architecture allows the speed and power consumption to be scaled according to the number of bins any particular remote needs to receive.

It will be recognized that an FFT can be performed on the reduce subset of received bins yet still reap the advantages inherent in the disclosed remote architecture. This is due to the fact that the FFT can be implemented using a digital signal processor of reduced complexity when compared to an FFT processing the entire bandwidth transmitted by the head end unit 25.

The decoding and formatting section 130 receives the processed output of the Fourier Transform section 125 and converts the received frequency domain constellation points into the corresponding data they represent thereby completing the recovery of the transmitted data. The decoding and formatting section 130 also performs any error correction, digital equalization, slicing to bits, framing, and descrambling that is required. Such decoding and formatting, as is readily recognized, is dependent on the framing and formatting used by the head end unit 25 in transmitting the data and may take on any form.

It is worth noting that phase compensation can be implemented in the decoding and formatting section 130 to compensate for any differences between the mixing frequencies of the transmitter of the head end unit 25 and the mixing frequencies of the remote of the remote service unit 30. Such phase compensation can be implemented by effectively rotating the phase of each received sub-symbol through a predetermined phase angle $\theta_3$ during each symbol period. As such, the phase angle through which each sub-symbol is rotated is a multiple of $\theta_3$. For example, a first sub-symbol during a first symbol period T1 is rotated by phase angle $\theta_3$ while the next sub-symbol received during a subsequent second symbol period T2 is rotated by a phase angle equal to $2*\theta_3$.

The output from the decoding and formatting section 130 is supplied to the input of one or both of an analog-to-digital section 132 and direct digital section 137. The analog-to-digital section 132 converts the digital information received from the decoding and formatting section 130 to an analog signal that may be supplied to various analog devices. The direct digital section 137 provides an interface between the digital signal output of the decoding and formatting section 130 and any digital data devices.

A centralized timing and control block 140 is used in the illustrated embodiment to provide the timing and control signals required to coordinate the operation of the other processing sections. It will be recognized, however, that this timing and control function may also be performed in a decentralized way, wherein each of the individual processing sections 115, 120, 125, and 130 contain or share individual timing and control circuitry. However, in such instances, additional synchronization circuitry dealing with the resulting asynchronous nature of the clocks in the individual sections may be required. Such a decentralized architecture could also require more pipelining with its associated memory.

Figure 7:
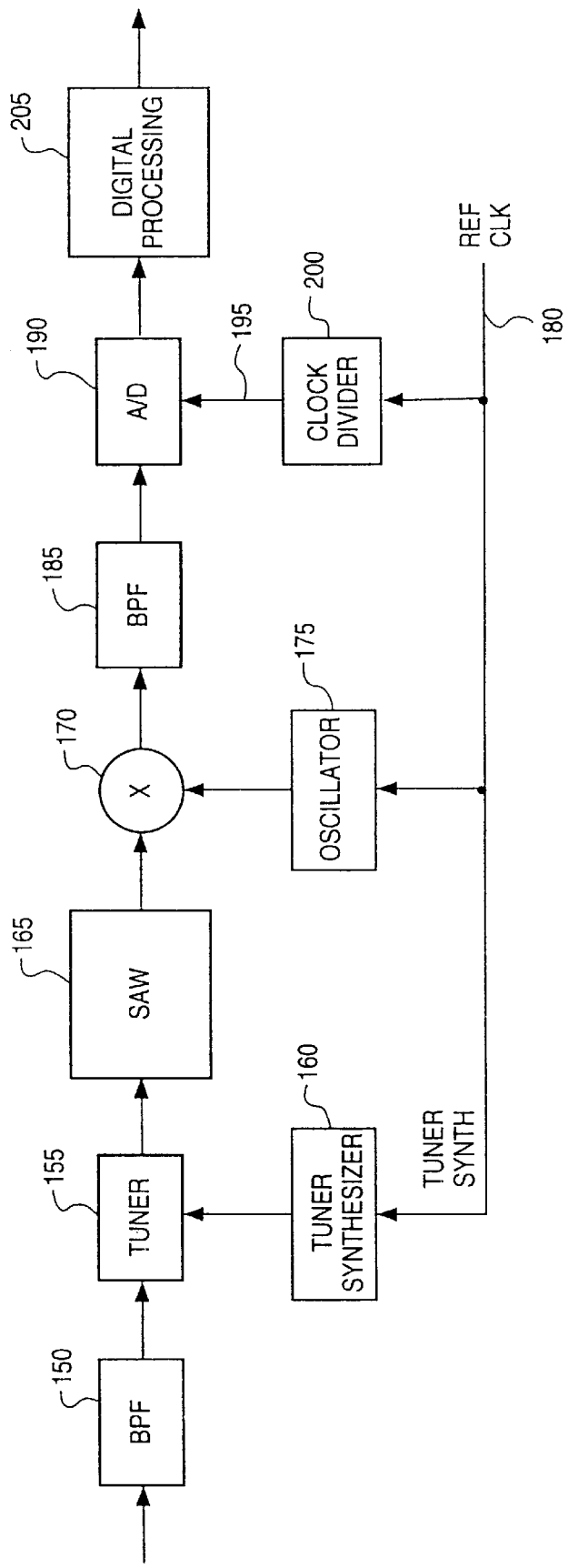

FIG. 7 illustrates one manner in which the RF section 115, the IF-to-digital section 120, and a portion of the Fourier Transform section 125 can be implemented. As shown, the signal transmitted from the head end unit 25 is received by a first bandpass filter 150 that, for example, has a wide pass band with end frequencies of about 470 MHz and 750 MHz. The signal from the bandpass filter 150 is supplied to the input of a tuner 155 that has its characteristics determined by the output of a tuner synthesizer 160 that is tied to receive the output of a reference clock that, for example, has a clock frequency of about 4 MHz. Without limitation, the tuner 155 mixes the signal from the bandpass filter 150 to a signal having a frequency of about 240 MHz. The output of the tuner 155 is supplied to the input of a further filter 165, a SAW filter in the illustrated embodiment. The output of SAW filter 165 is supplied to an IF mixer 170 that transposes the signal to an intermediate frequency (IF) of, for example, 10.7 MHz. The mixer 170 performs the IF conversion by mixing the signal received from the SAW filter 165 with the signal generated by oscillator 175. The signal generated by the oscillator 175 is synchronized to the referenced clock signal received on line 180.

The received signal, now converted to the IF band, is subsequently supplied to the input of an IF bandpass filter 185 that, for example, has a 300 KHz bandwidth and a center frequency of about 10.7 MHz. The output of the bandpass filter 185 is an OFDM/DMT modulated signal having only a subset of the entire number of bins transmitted by the head end unit 25. One or both of the filters 165 and 185, however, may be used to reduce the bandwidth of the received signal so as to limit the number of bins that are ultimately processed. The filtered IF signal is converted to a digital signal by an A/D converter 190 that has its conversion clock on line 195 synchronized to the reference clock on line 180 through a clock dividing circuit 200. As noted above, the conversion clock frequency may be selected to be low enough to result in undersampling of the IF signal thereby reducing the number of samples supplied at the A/D converter 190 output. An increase in the sampling rate, however, can be used to compensate for any inexactness of filters 170 and/or 185.

The output of the A/D converter 190 is supplied to the input of a digital signal processing circuit 205 that generates the Fourier Transform of the signal that it receives, extracts the received symbols based on the Fourier Transform information, and performs any other processing functions required. In a cable telephony system, the output of the digital processing circuit 205 may be supplied to the inputs of one or more D/A converters or CODECs that convert data contained in the received symbols to one or more analog output signals, such as audio voice signals, that can be heard by a person engaged in a telephone conversation.

Figure 8:
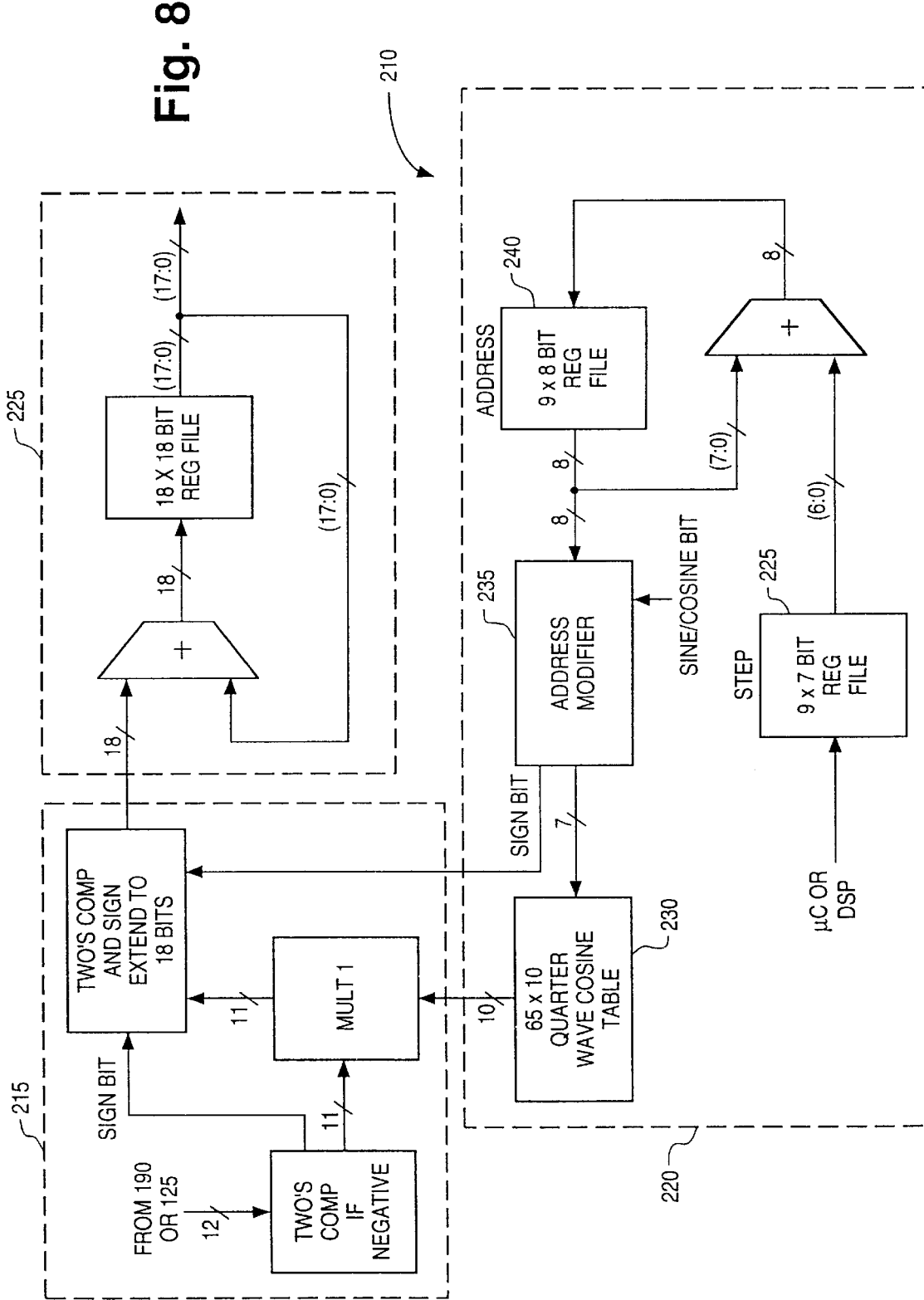

FIG. 8 illustrates one embodiment of a hardware correlator 210 that may be used in the Fourier Transform section 125. The illustrated hardware correlator 210 is designed to correlate nine frequency bins within the total bandwidth of frequency bins that are provided in digital format at the output of the A/D converter 190 of, for example, the IF-to-digital circuit 120. The correlator 210 includes a multiplier section 215, a frequency generator section 220, and an accumulator section 225. As shown, the multiplier section 215 receives the digital data that is output from the IF-to-digital section 125 and multiples each value by the sine and cosine value of each of nine frequency bins. The sine and cosine values are supplied as inputs to the multiplier 215 from the frequency generator section 220. The frequency generator section 220 includes a step-size register 225 that includes, in the present embodiment, nine register locations that are programmed by a microcontroller or digital signal processor. The values stored in the step-size register 225 are used to determine the step-size of the addresses supplied to address the data in a cosine table ROM 230, shown here has a quarter wave cosine table. An address modifier circuit 235 receives the address data from the address register 240 and modifies the data so that the address data supplied to the cosine table ROM 230 falls within an acceptable range of addresses and thereby accesses the proper portion of the wave. A sine-cosine bit is supplied from, for example, the timing and control circuit 140 so that each value received from the IF-to-digital converter 125 is multiplied by both the sine and cosine values of each of the nine frequency bins. The data resulting from the multiplication operation are accumulated in the accumulator section 225 and output to the decoder/formatting section 130 for further processing.

Figure 9:
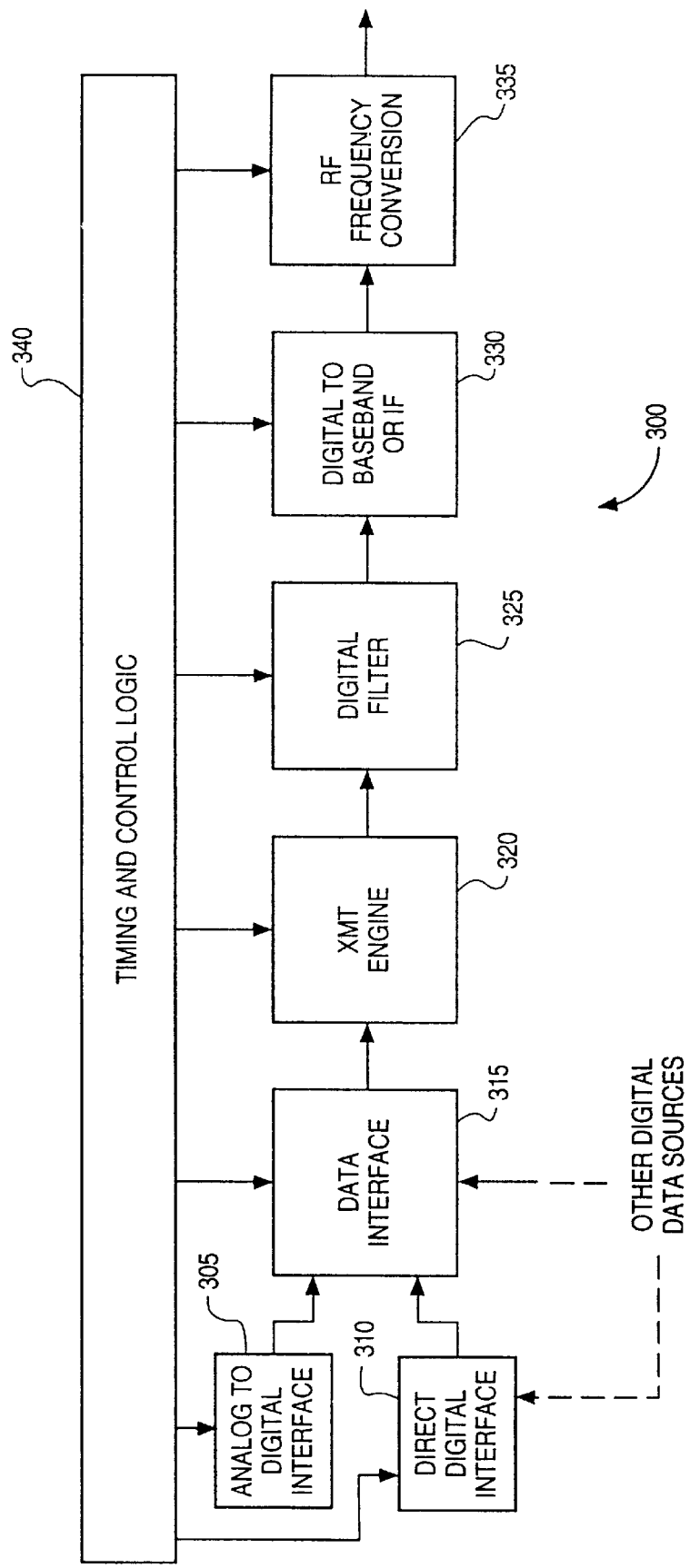
FIGS. 9–11 illustrate various embodiments of the transmitter of the remote service unit at various levels of detail.

One embodiment of a transmitter suitable for use in the remote service units 30 is illustrated in FIG. 9. The transmitter, shown generally at 300 transmits its digital data in an OFDM/DMT modulated format using a number of bins that is less than the number of bins transmitted and received by the head end unit 25. Accordingly, the transmitter 300 can generate the OFDM/DMT transmission output by modulated direct digital synthesis.

The transmitter 300 of the illustrated embodiment is designed to accept both analog and digital signal information for OFDM/DMT transmission. Accordingly, the transmitter 300 includes an analog-to-digital interface unit 305 and a direct digital interface unit 310. The analog-to-digital interface unit 305 is used to sample an analog signal, such as a voice signal of a person engaged in a telephone conversation, and convert it to digital data to be transmitted. For example, the analog-to-digital interface unit 305 may contain CODECs and SLICs for connecting one or more telephones to the system.

The direct digital interface unit 310 interfaces with any type of device that provides a signal that is already in digital format. For example, the direct digital interface unit 310 might have a serial interface for receiving data, as in a modem application. The unit 310 might also receive data from a system CPU to be sent to the remote of the head end unit 25.

The transmitter 300 also includes a data interface unit 315. The data interface unit 315 receives data from any combination of the following: sampled analog data from the output of the analog-digital interface unit 305, direct digital data from the output of the direct digital interface unit 310, or other digital data sources that, for example, provide system communication information generated from within or without the data interface unit 315. The data interface unit 315 formats the data received from these data sources into a single data stream. Tasks such as data framing, scrambling, error correction coding, CRC generation, data synchronization, and stuffing may be performed by the data interface unit 315 as part of the formatting function. Optionally, the data interface unit 315 may group the data into words that represent the unique constellation points to be transmitted. As will be readily recognized, the specific formatting operations executed by the data interface unit 315 are dependent on the particular requirements of the communications system in which the remote service unit 30 is employed.

The serial data stream output from the data interface unit 315 is supplied to the input to the transmit engine circuit 320. The data that the transmit engine circuit 320 receives includes one constellation point for each OFDM/DMT bin of the reduced set of bins that is active during a single symbol time. The transmit engine circuit 320 is responsible for calculating the Inverse Fourier Transform on the data stream that is to be modulated and for producing a time domain sequence for each symbol along with any cyclic prefix. Generally, systems using OFDM/DMT modulation perform this function using an IFFT that is implemented, for example, with a digital signal processor. However in a multi-point application, such as the communication system disclosed herein, only a limited number of the possible frequencies or bins are used by each secondary transmitter. Given that only a portion of the total available transmission bandwidth is utilized, the disclosed secondary transmitter architecture is more efficient and cost-effective.

In the preferred embodiment of the transmit engine circuit 320, the time domain sequence is generated by modulated direct digital synthesis, sample by sample. In addition to reducing the complexity of the transmitter, this operation reduces system latency. The time domain sequence for a given symbol is created by generating sine wave, sample by sample, and adding them together. The frequency determines the bin in which the data will be received. The phase and amplitude are used to convey the data intelligence.

Additionally, the preferred embodiment of the system is such that there are 256 bins between 0 Hz and the Nyquist frequency. This is typical in OFDM/DMT systems. That is, the spectrum between 0 Hz and the Nyquist frequency is divided into a number of bins wherein the number is a power of 2, i.e. $2^n$ where n is an integer. This facilitates the use of FFTs and IFFTs. However, the presently disclosed transmitter 300 preferably uses a Nyquist frequency that is greater than the transmit bandwidth, thereby leaving a number of bins turned off on each edge. Such a transmission scheme provides a natural filtering effect at the edges of the bandwidth. In the preferred embodiment, 209 bins fit within the allocated transmit bandwidth. An additional eight bins are turned off on either end of that bandwidth to leave some transition bandwidth for filters.

Optionally, the transmitter 300 may utilize a digital filter 325 that receives the output of the transmit engine circuit 320. This optional filter performs any desired digital filtering of the output stream and, for example, may be useful in further limiting the bandwidth of the signal.

The digital sequence output from either the digital filter 325 or the transmit engine circuit 320 is supplied to the input of a digital-to-baseband converter or a digital-to-IF converter 330 depending on whether the signal output is at an IF or at baseband. The converter 330 includes components that perform digital-to-analog conversion and analog filtering. If the output is at an IF, a bandpass filter centered around any image of the output spectrum may be employed. This results in an IF signal that is more easily processed in subsequent operations.

The output of the converter 330 is supplied to the input of an RF frequency converter 335. The RF frequency converter 335 shifts the OFDM/DMT spectrum from IF or baseband to the desired RF frequency. As will be readily recognized, the RF frequency converter 335 may be implemented using a combination of mixers, filters, and frequency synthesizers to implement the conversion functions and provides an OFDM/DMT output that is suitable for transmission along the transmission medium.

Timing and control of the transmitter system 300 is provided by a common timing and control logic circuit 340. A centralized timing and control circuit 340 is used in the illustrated embodiment. This function, however, could also be performed in a decentralized way. If decentralized timing and control are utilized, the timing and control circuits would likely be more complex to deal with the resulting lack of synchronism between circuits. It could also require more pipelining with its associated memory.

Figure 10:
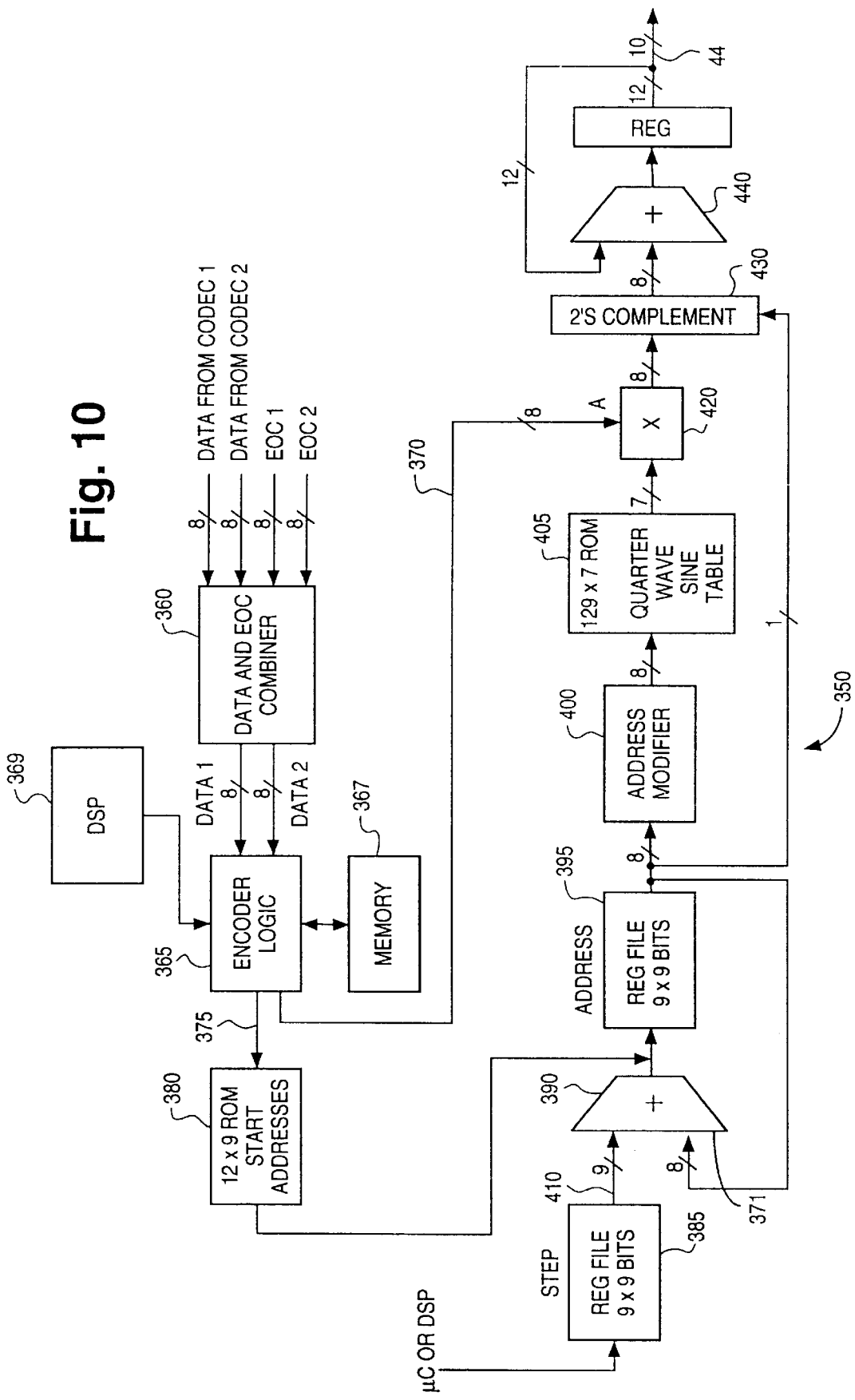

One embodiment of digital transmission circuitry that may be used to generate the digital OFDM/DMT signal for subsequent D/A conversion and RF modulation is set forth in FIG. 10. The digital transmission circuitry 350 illustrated here may be used to implement, inter alia, the transmit engine circuit 320 of FIG. 9. The digital transmission circuitry 350 accepts digital data from, for example, the output of first and second CODECs respectively associated with individual first and second telephones. Additionally, the circuitry 350 may receive signal data that is to be transmitted in embedded control channels within the transmitted signal, each of the embedded control channels being respectively associated with one of the first and second telephones. The digital data output from the CODECs and on the embedded control channels are combined together by a combiner circuit 360 into two separate data groups, illustrated here as DATA1 and DATA2. The presently disclosed embodiment provides the capability of generating OFDM/DMT transmissions in one or more of nine frequency bins.

Each data group DATA1 and DATA2 is supplied to the input of an encoder logic circuit 365. The encoder logic circuit 365 divides the data groups into symbol groups and maps each symbol to a point of a constellation to obtain a phase and amplitude for each symbol. The amplitude information for each symbol is provided on one or more lines 370, while the phase information for each symbol is provided on one or more lines 375.

Generation of the desired frequency and phase for each symbol takes place through the interrelated operation of the start address selection ROM 380, the step size selection register 385, adder 390, address register 395, address modifier 400, and sine table ROM 405. The sine table ROM 405 contains the digital data representation of a sine wave, or selected portion thereof, shown here as a quarter wave table, in successive addressable memory locations. The successive, addressable memory locations of the sine table ROM 405 are addressed in a specific manner to provide a digital output signal having the phase and frequency characteristics of the symbol that it is to represent. The phase of the sine wave represented by the digital output signal is dependent on the memory location that is first addressed at the beginning of the symbol period while the frequency of the sine wave is determined by the rate at which successive memory locations within the sine table ROM 405 are addressed.

The selection of the memory location that is first addressed at the beginning of a symbol period is dependent on the phase information on output lines 375 of the encoder logic circuit 365. The phase information is supplied to the start address ROM 380 which provides a start address which is output to the address storage register 395. The step size through which the memory locations within the sine table ROM 405 are to be cycled is determined by the value at the output of the step size storage register 385. The step size storage register 385 includes one or more memory storage locations that are accessible to a microcontroller or DSP. The microcontroller determines the step sizes that are stored in the step size storage register 385 based on the desired symbol carrier frequency bins that can be used—the larger the step size, the higher the carrier frequency. In the illustrated embodiment, the step size register 385 includes nine register locations for the nine bins that can be transmitted. Preferably, the step size register 385 is programmed by the microcontroller based on commands received from the head end unit 25. The step size value is supplied at one or more output lines 410 of the step size register 385 to the input of the adder 390. The adder 390 functions to provide the address signals that are used to successively address the memory locations of the sine table ROM 405. Accordingly, the output of the address register 395 is fed back to the input of the adder 390 so that the sine table ROM 405 selection address is incremented by the appropriate step size on each successive addressing cycle corresponding to the particular frequency bins.

Since the sine table ROM 405 of the present embodiment only contains a portion of a single sine wave, an address modifier 400 is used. The address modifier 400 includes combinational and/or programmed logic circuits that perform calculations that ensure that the address value supplied to the sine table ROM 405 falls within an acceptable range and thereby accesses the appropriate portion of the wave. Such calculations ensure that the newly calculated address starts at the appropriate portion of the sine table ROM 405 without generating an undesired discontinuity.

The output of the sine table ROM 405 is supplied to the input of a multiplier 420. The multiplier 420 accepts each digital data value that is output from the sine table ROM 405 and multiplies each value by the corresponding amplitude factor as determined from the amplitude information output of the encoder logic circuit 365 received along lines 370.

Since the sine table ROM 405 of the presently disclosed embodiment includes only positive values, some circuitry must be provided to generate the negative portions of the wave. To this end, the output of the multiplier 420 is supplied to a two's complement converter 430 and the most significant bit (MSB) from the address register 395 is used to signal the converter 430 to either through-connect the output of the multiplier 420 to an accumulator 440 or perform a two's complement operation on the output before providing it to the accumulator 440. The accumulator 440 adds all of the data points for the nine frequency bins that are generated during a single sample period and provides the resulting data on output lines 445.

As will be readily recognized, the timing and control inputs from the timing and control logic circuitry 340 are not illustrated in FIG. 10. Such inputs have been omitted in order to simplify the figure. Given the foregoing description, the timing and control operations can be readily derived.

Figure 11A:
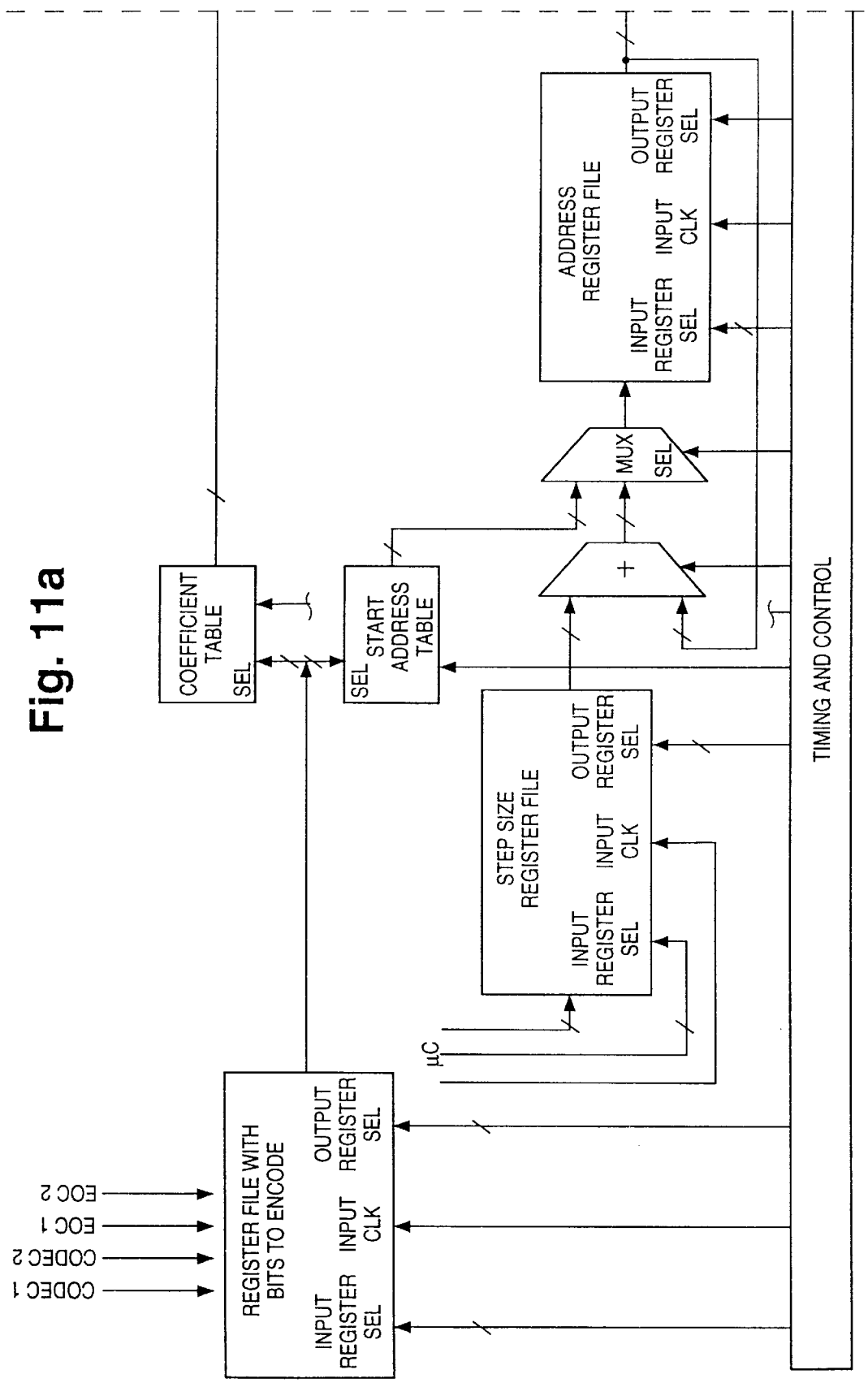
Figure 11B:
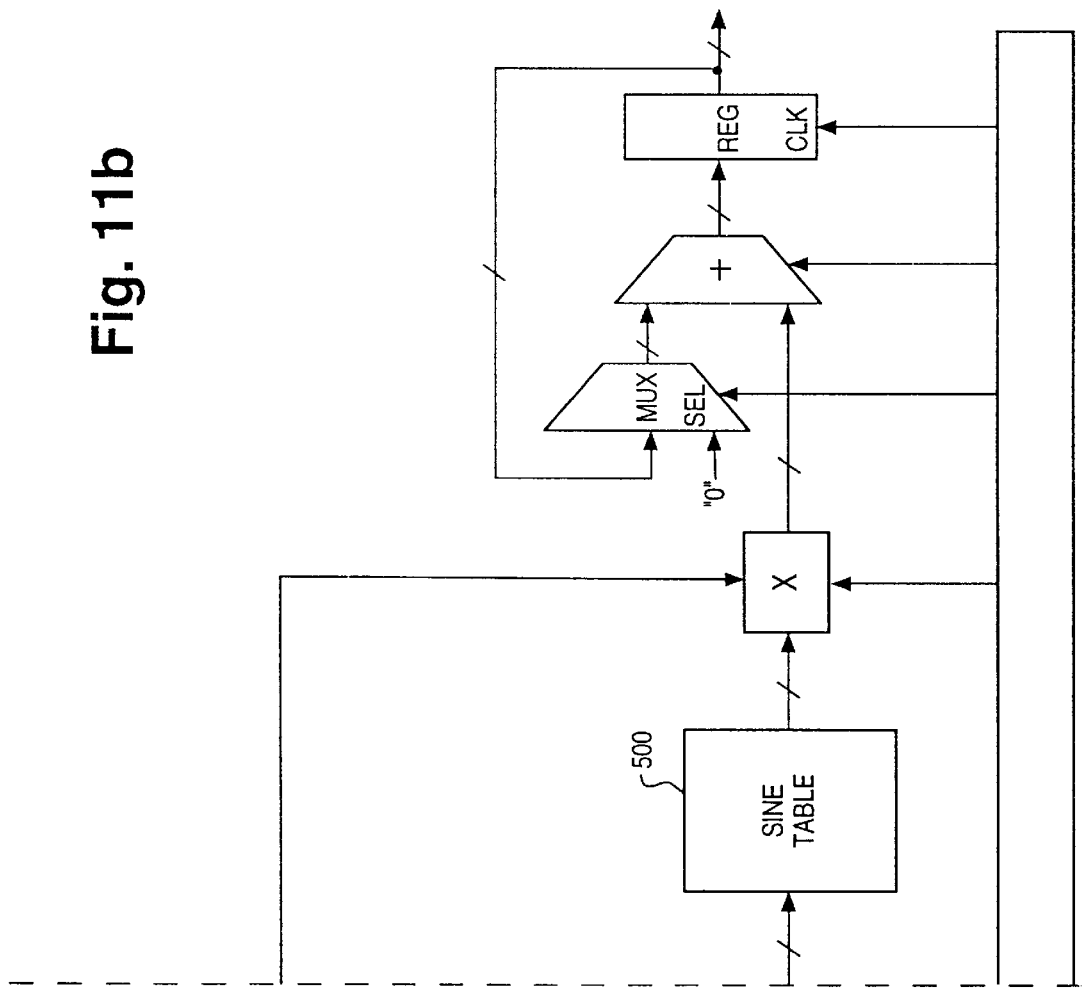

FIG. 11 shows yet a further embodiment of the basic elements of the transmit engine shown in FIG. 10. In the embodiment of FIG. 11, a full wave sine table ROM 500 is utilized. Accordingly, the two's complement circuit 430 and the address modifier 400 are not provided.

Figure 12:
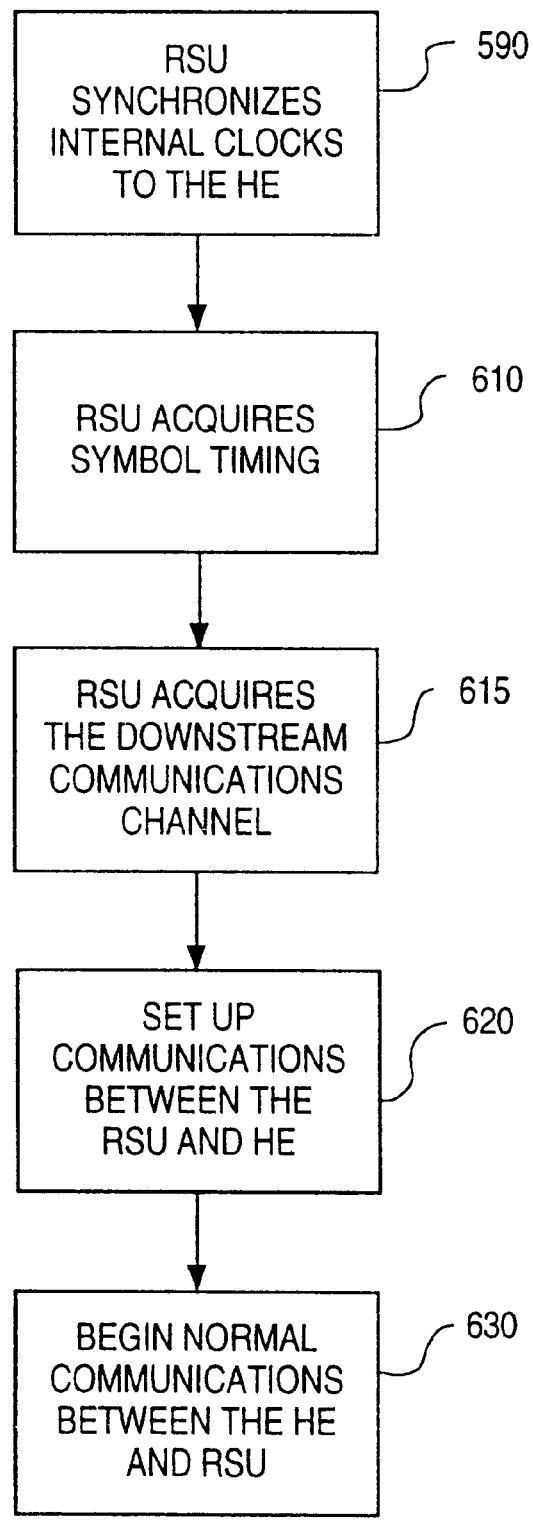
FIGS. 12–14 illustrate one way in which the head end unit and a newly added remote service unit can initialize communications.
Figure 13:
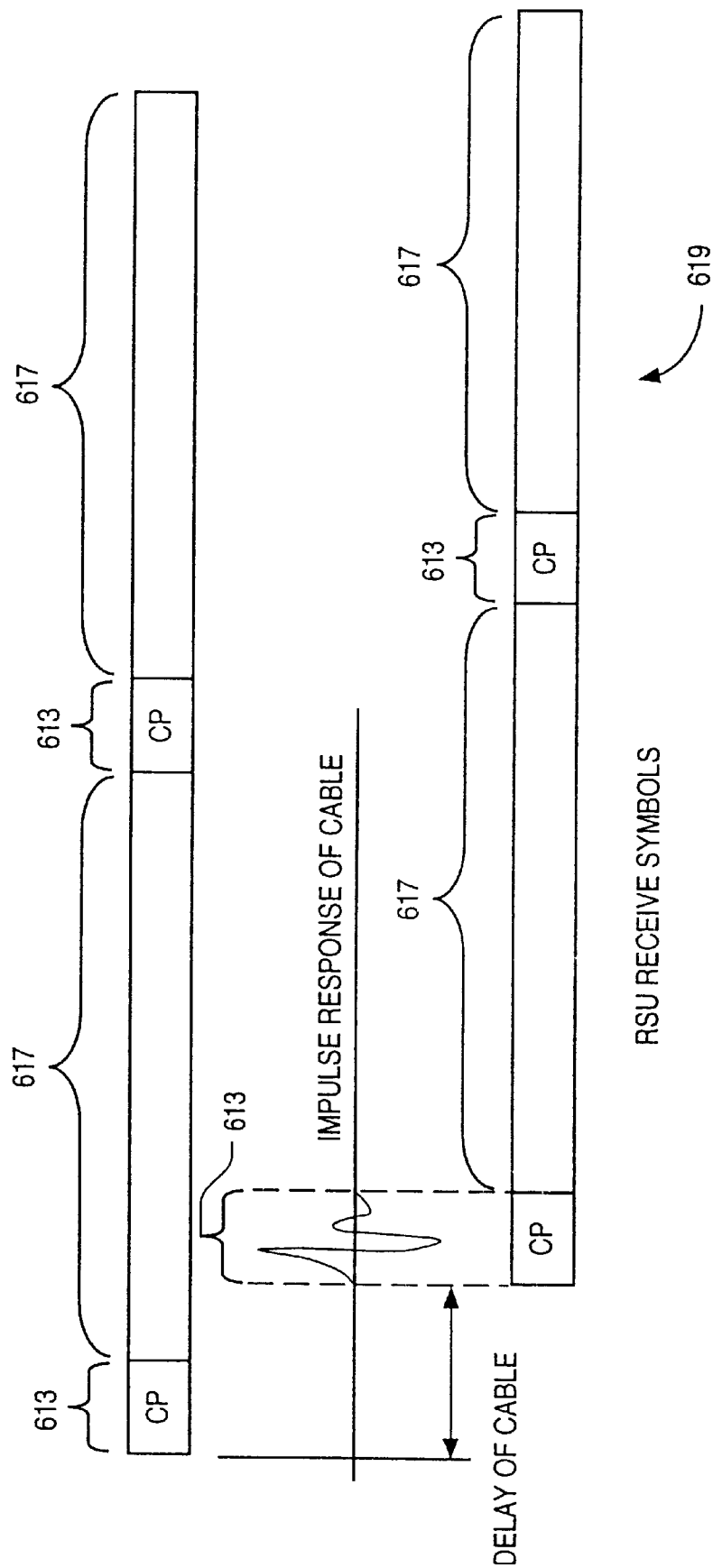
Figure 14:
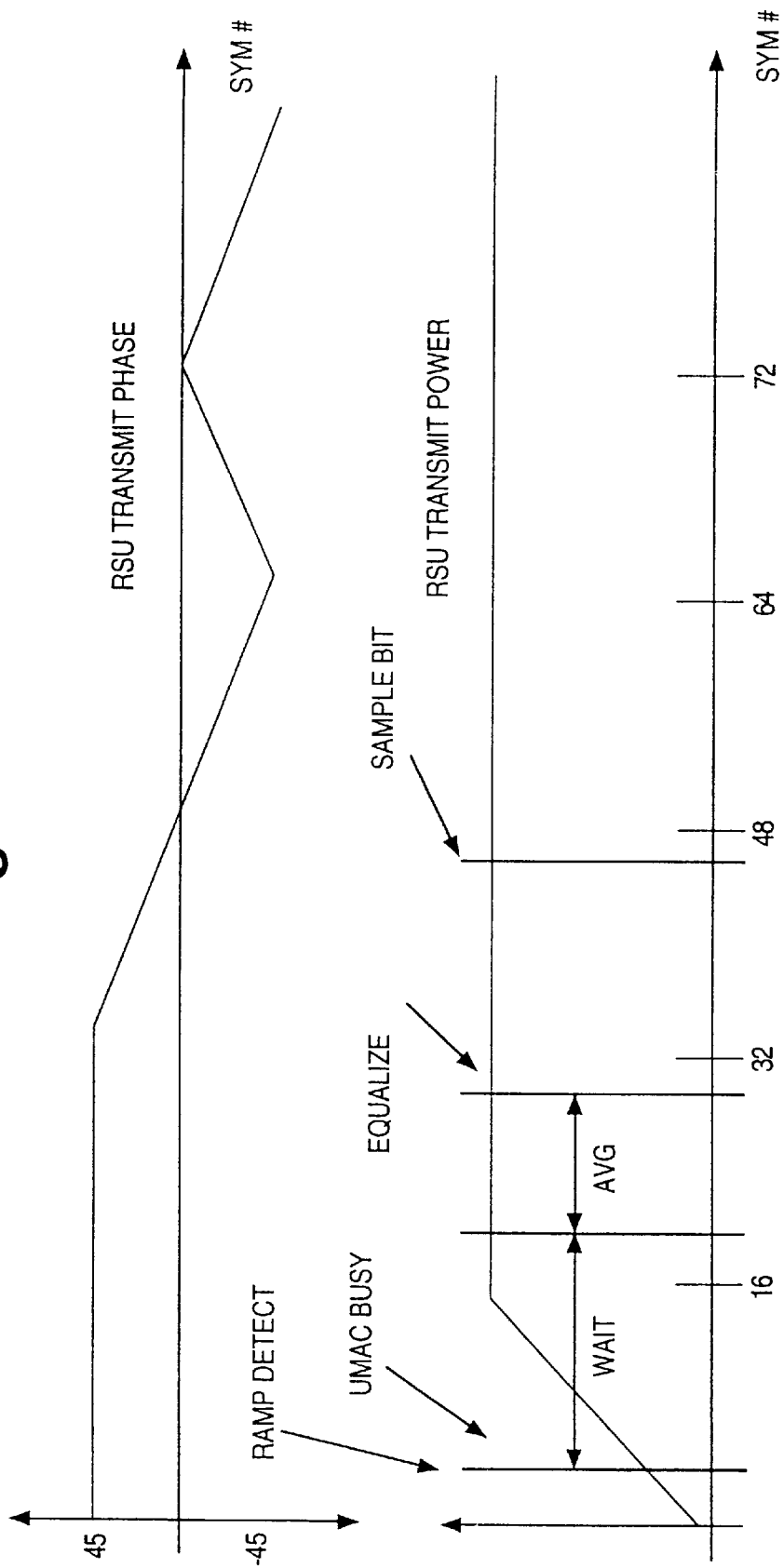

Next, the discussion turns to another inventive feature of the present invention, namely a method and apparatus of establishing communications over an up-stream multi-access channel (UMAC) from a remote service unit 30 to the head end unit 25. FIGS. 12–14 illustrate one manner of initiating communications between a newly added or powered-up remote service unit 30 and the head end unit 25. As shown at step 590, the remote service unit 30 first synchronizes its internal clocks with the head end unit 25. One way in which this may be accomplished can be described with reference to FIG. 2. A pilot tone may be added by the head end unit 25 to a predetermined bin output that is transmitted to the remote service units 30. The pilot tone is extracted from the received signal by the remote of the remote service unit 30 and used, for example, as a reference signal for a phase-locked-loop circuit 600. The output of the phase-locked-loop 600 is provided to the input of a voltage controlled oscillator 605 which generates the reference clock for the remote service unit 30.

After the clock synchronization of step 590 is completed, the remote service unit 30 acquires its symbol timing at step 610. One way in which symbol timing may be acquired is illustrated in FIG. 13 which shows an impulse signal 613 being added by the head end unit 25 to the cyclic prefix CP of each symbol transmission. Preferably, the impulse signal 613 reverses polarity with each successive symbol transmission so that a positive polarity impulse signal is added to the cyclic prefix of one symbol transmission while a negative polarity impulse signal is added to the cyclic prefix of the subsequent symbol transmission.

The receiver 110 of the remote service unit 30 finds the time location of the transmitted impulse signal by sampling, at a predetermined rate, the symbols that it receives and alternately adding and subtracting the samples of individual sample periods over several symbol periods. For example, the receiver 110 may sample the received signal at a rate of 100 samples per symbol period to generate samples SA0 . . . SA99 during a first symbol period, SB0 . . . SB99 samples that it receives during a subsequent symbol period, SC0 . . . SC99 samples that it receives during a subsequent third symbol period, and so on. A first sum Y0 is generated from the first sample period of each sampled symbol period in accordance with Y0=SA0=SB0+SC0. Similar sums are generated for each of the sample periods through Y99 and the resulting sums are analyzed to determine where the peak amplitude occurs in the sampled symbol period. The time position of the peak amplitude corresponds to the time position of the added impulse signal and, thus, the time position of the cyclic prefix occurring at the beginning of each transmitted symbol 617. The receiver 110 can then make the requisite adjustments to ensure that it receives the symbols 617 in proper alignment.

Moreover, the method and apparatus for symbol alignment discussed is described in more detail in a copending application, Ser. No. 08/845,544, filed Apr. 24, 1997, entitled "Apparatus and Method for Symbol Alignment in a Multipoint OFDM/DMT Digital Communications System," which is incorporated herein in its entirety by reference.

Once the receiver 110 has acquired downstream symbol alignment, the system proceeds to step 615 where it acquires the downstream communications channel 619. The downstream communications channel comprises one or more bins used by the head end unit 25 to establish initial communications with receiver 110.

After the receiver 110 has acquired the downstream communications channel, setup of the remote service unit 30 communications proceeds to step 620. At step 620, the newly added or newly powered-up remote service unit 30 must inform the head end unit 25 that it is in need of registration whereby, among other things, the head end unit 25 allocates bins to the remote and transmitter of the remote service unit 30. One problem associated with any initial transmission from the remote service unit 30 to the head end unit 25 is that the transmit boundary of the newly added remote service unit is not aligned with the transmit boundary of the other remote service units on the system. Thus, any misaligned transmission from the newly added remote service unit may corrupt the transmissions received from other remote service units.

Another inventive feature of the present invention is to overcome the problem of initial misalignment between the head end unit 25 and an unregistered remote services unit 30. FIG. 14 illustrates one embodiment for solving the misalignment problem. To overcome the problem, a predetermined upstream bin is allocated by the network as an upstream multi-access channel (UMAC). One or more UMAC channels may be utilized. Optionally, the UMAC channel may be afforded a narrow bandwidth relative to other channel bandwidths in the system 20 in order to minimize interference with adjacent channels. However, if inter-channel interference is not a problem, the UMAC channel may be given a broad bandwidth. Each remote service unit 30 is assigned to at least one UMAC channel. Prior to communication over the network, a remote service unit 30 must register with the head end unit 25. The process of registration includes synchronizing the transmitter of the unregistered remote service unit 30 with the receiver of the head end unit 25. To initiate registration, the transmitter of the newly added unregistered remote service unit 30 transmits registration information on the upstream multi-access channel according to a predefined asynchronous transmission sequence (ATS) format.

FIG. 14 illustrates an exemplary ATS format in which phase and power of transmitted signals are altered overtime according to a predefined format. As shown in FIG. 14, the newly added remote service unit 30 first maintains its transmit phase at a predetermined phase while gradually increasing the transmit power. The head end unit 25 may receive such a signal with little or no corruption of the data transmitted upon adjacent channels from the other remote service units 30 by controlling the UMAC channel bandwidth and ATS signal format. Once the head end unit 25 detects the transmission from the newly added remote service unit 30, it may perform any requisite processing of the received signal, such as equalization thereof After a predetermined period of time has elapsed, in the embodiment of FIG. 14, the newly added remote service unit 30 begins to slowly vary the phase of its transmitted signal in the illustrated manner (FIG. 14). The transmit phase is varied so as to convey intelligent data to the head end unit 25. Accordingly, the head end unit 25 samples the amplitude and phase of the signal that it receives on the upstream multi-access channel and uses the data, for example, to identify the newly added remote service unit 30.

After the newly added remote service unit 30 has been identified by the head end unit 25, the head end unit 25 commands the newly added remote service unit 30, via a downstream communications channel, to send, for example, an impulse signal of a predetermined amplitude. The head end unit 25 detects the time position of an impulse signal and provides the remote service unit 30 with the information necessary to align its symbol transmissions with the symbol transmissions of the other remote service units 30. Further communications between the newly added remote service unit 30 and the head end unit 25 may take place over the UMAC channel and downstream communications channel until the head end unit 25 allocates separate upstream and/or downstream channels to the newly added remote service unit 30. Once these channels are allocated, the head end unit 25 informs the remote service unit 30, accordingly. Once the foregoing registration process has been completed, the head end unit 25 and the newly registered remote service unit 30 carry out standard communications at step 630.

FIGS. 15–20 illustrate a more detailed implementation of the embodiment described above in connection with FIGS. 12–14. FIGS. 15A and 15B illustrate, in more detail, the format for an asynchronous transmission sequence (ATS) which is transmitted over the upstream multi-access channel (UMAC) for asynchronous communication between a non-registered remote service unit 30 and the head end unit 25. The upstream multi-access channel is located at a predetermined carrier frequency (UMAC bin) defined by the network head end unit 25 and known to all remote service units 30. When a non-registered remote service unit 30 wishes to register with the head end unit 25, the remote service unit 30 transmits registration related information bits to the head end unit 25 via the upstream multi-access channel. The registration information bits are encapsulated in a packet format. It is preferable, though not required, that the remote service unit 30 transmit all packet communications related to registration over the upstream multi-access channel in one predefined asynchronous transmission sequence (ATS) signal. A single asynchronous transmission sequence may contain one or multiple packets of data (registration data or otherwise). Each remote service unit 30 and the head end unit 25 may be preconfigured to send and process, respectively, a desired asynchronous transmission sequence. The sequence allows transmission of data bits from the RSU to the MRF in a packet or group of packets for purposes of registering that RSU. One preferred asynchronous transmission sequence is described below in connection with FIGS. 15–19.

FIG. 15A illustrates the magnitude envelope 700 of data transmitted in the UMAC bin as a function of time, while FIG. 15B illustrates the phase format 705 of data in the ATS signal transmitted in the UMAC bin as a function of time for a particular group of data bits as an example. FIGS. 15A and 15B illustrate the ATS signal format in the frequency domain, and thus the data transmitted in the UMAC bin may constitute as a complex number. The ATS signal may be divided into three primary segments, and sub-divided into four subsegments. Optionally, the ATS signal includes an establishment segment 710, a data segment 715 and a termination segment 720. It is preferable that every ATS signal transmitted on the UMAC bin contain at least an establishment segment 710 and data segments 715 of some predefined format, but not necessarily termination segment 720. By way of example only, the termination segment 720 may not be needed in future communications are expected or if symbol synchronous termination is provided. During registration, the head end unit 25 identifies the onset of an asynchronous transmission sequence based on the establishment segment 710 and may identify the conclusion of an asynchronous transmission sequence based on the termination segment 720 or some other factor. The head end unit 25 further utilizes the establishment segment 710 to estimate a synchronization reference point within the ATS signal and based thereon identifies the starting point of each block of symbols within the data segment 715. Once the reference point has been identified, the head end unit 25 demodulates the data within the data segment 715 in order to effect registration.

The establishment segment 710 includes a ramp-up period 725 and a hold-time period 730. The communications segment 715 is comprised of one or more symbol blocks 735, and the termination segment 720 comprises a ramp-down period 740. Each of the segments 710–720 and periods 725–740 comprise one or more symbols 745 which are grouped into symbol blocks. The symbol blocks are segmented to form segments 710–720. Each symbol 745 is assigned a corresponding amplitude and phase as defined by the format of the ATS signal in FIGS. 15A–15B depending upon the symbol position within the ATS signal.

During the ramp-up period 725, the RSU 30 gradually increases the amplitude of the signal transmitted in the UMAC bin in a manner according to the ramp-up amplitude 750. For example, the RSU 30 may transmit a sequence of symbols having linearly increasing amplitudes, but constant phase over the ramp-up period 725. Preferably, the ramp-up amplitude 750 increases over a predefined number of symbols and in a linear manner with a predefined number of incremental increases in the data amplitude. By way of example only, the ramp-up period 725 may be 20 symbols in length with four amplitude increases equally spaced throughout each symbol. Alternatively, a different number of symbols and a different number of amplitude changes may be utilized, linear or non-linear, provided that the ramp-up amplitude 750 does not produce excessive noise in the bins or channels adjacent to the UMAC bin or channel, for instance, preferably at least 30 dB below the signal power of the UMAC bin. Alternatively, the amplitude may decrease over all or part of the ramp-up period 725. Optionally, the ramp-down period 740 if included may substantially mirror the ramp-up period 725, wherein successive sets of symbols are decreased in amplitude over a predetermined number of symbols in predetermined increments, such as illustrated by the ramp-down amplitude 755.

During the ramp-up and ramp-down periods 725 and 740, the phase of the symbols transmitted in the UMAC bin may be held constant at a predetermined phase $\phi_{RSU}$. FIG. 15B illustrates exemplary ramp-up and ramp-down phases 760 and 765 during the ramp-up and ramp-down periods 725 and 740, respectively. It is to be understood that the illustrated ramp-up and ramp-down phases 760 and 765 may be changed without loss of effectiveness to the detection and estimation procedures carried out to register the RSU 30 with the head end unit 25. Changing phase may increase bandwidth, and therfore, a constant phase may be preferred.

In the preferred embodiment, at registration, the RSU 30 gradually increases the amplitude of successive symbols over the ramp-up period 725, since the RSU 30 transmitting the ATS signal is not symbol aligned at the head end unit 25 with the other RSUs 30. When the unregistered RSU 30 transmits a registration request, it does so at a symbol timing that is not aligned with the other RSUs 30. Hence, the signal is not orthogonal to the signals from the other RSUs 30. Accordingly, it is preferable to introduce the UMAC bin signal slowly enough, such that the amplitude and phase of the ATS signal do not inject undue power into the bins adjacent to the UMAC bin, as seen by the head end unit 25. The establishment segment 710 affords the head end unit 25 an opportunity to acquire an initial bit-time synchronization for the asynchronous transmission sequence of the RSU 30. The head end unit 25 may later refine the bit-time synchronization in the ATS signal, it is preferable to achieve a relatively accurate initial bit-time synchronization.

The RSUs 30 may seek registration over the UMAC bin (also referred to as a channel) at a random time. Thus, it is preferable that the head end unit 25 detect the onset of an ATS signal as it occurs. The head end unit 25 detects the onset of an ATS signal by continuously monitoring the amplitude, power and/or phase of the UMAC bin or channel. When the power and/or phase of the UMAC bin or channel exceeds a predetermined threshold, the head end unit 25 identifies this condition to represent the beginning of an ATS signal. For example, the RSU 30 may gradually increase the amplitude of the symbols based on the ramp-up amplitude 750 to drive the power of the UMAC channel upward to exceed the threshold and notify the head end unit 25 of the beginning of an ATS signal.

At the conclusion of the ramp-up period 725, the RSU 30 controls the ATS signal to enter a hold-time period 730 during which at least one of the amplitude and phase remain constant for a group of successive symbols transmitted over the UMAC bin. Alternatively, the amplitude and phase may follow a predetermined training patter. In the example of FIGS. 15A and 15B, the RSU 30 holds the amplitude constant at $V_{RMS}$, and the phase constant at $\phi_{RSU}$ for a hold-time period 725. The hold-time period 725 permits the head end unit 25 to identify the transition point 770 between the ramp-up period 725 and the hold-time period 730. The transition point 770 is also referred to as the ramp-up knee or synchronization reference point. As explained below, the head end unit 25 performs the initial bit-time synchronization for the ATS signal based on the identification and location of the transition point 770. Bit-time synchronization between the head end unit 25 and RSU 30 enables the head end unit 25 to decode the data bits within the data segment 715. The length of the hold-time period 730 may vary, provided it is sufficiently long to allow the head end unit 25 to estimate the transition point 770 and achieve the initial bit-time synchronization. By way of example only, the hold time period 730 may be ten symbols in length.

The data segment 715 represents the period of time during which actual ATS signal data bits are communicated to the head end unit 25. During the data segment 715, one data bit may be communicated to the head end unit 25 for each symbol block 735. The number of symbols in each symbol block 735 may be chosen to maximize the rate at which bits are communicated to the head end unit 25. Preferably, the number of symbols 745 within each symbol block 735 is chosen so as not to produce excessive noise in the bins adjacent to the UMAC bin, as described in connection with the ramp-up and ramp-down periods 725 and 730. By way of example only, each symbol block 735 may include ten symbols. The length of the data segment 715 is determined by the number of data bits which must be communicated to the head end unit 25 during the ATS signal.

Optionally, the magnitude of the symbols transmitted in the UMAC bin may be held constant throughout the data segment 17, such as at a value $V_{RMS}$. By maintaining the symbol magnitude constant throughout the data segment 715, the signal-to-noise ratio is maximized for a given average transmit power per bin. Maintaining constant symbol amplitude throughout the data segment 715 also reduces the noise introduced into adjacent bins. Optionally, the data segment may carry data bit information by varying the phase of the symbols. Alternatively, the data segment may vary both phase and amplitude, provided that the amount of amplitude variation and phase variation, in combination, do not introduce excessive noise into adjacent bins.

The RSU 30 may implement any of several types of transmitter designs to generate and transmit the ATS signals. For example, the RSU 30 may utilize the transmitter 300 of FIG. 9, the digital transmission circuitry 350 of FIG. 10 and/or the transmit engine of FIG. 11. Alternatively, the RSU may utilize a more general transmitter 900 as illustrated in FIG. 20.

Figure 20:
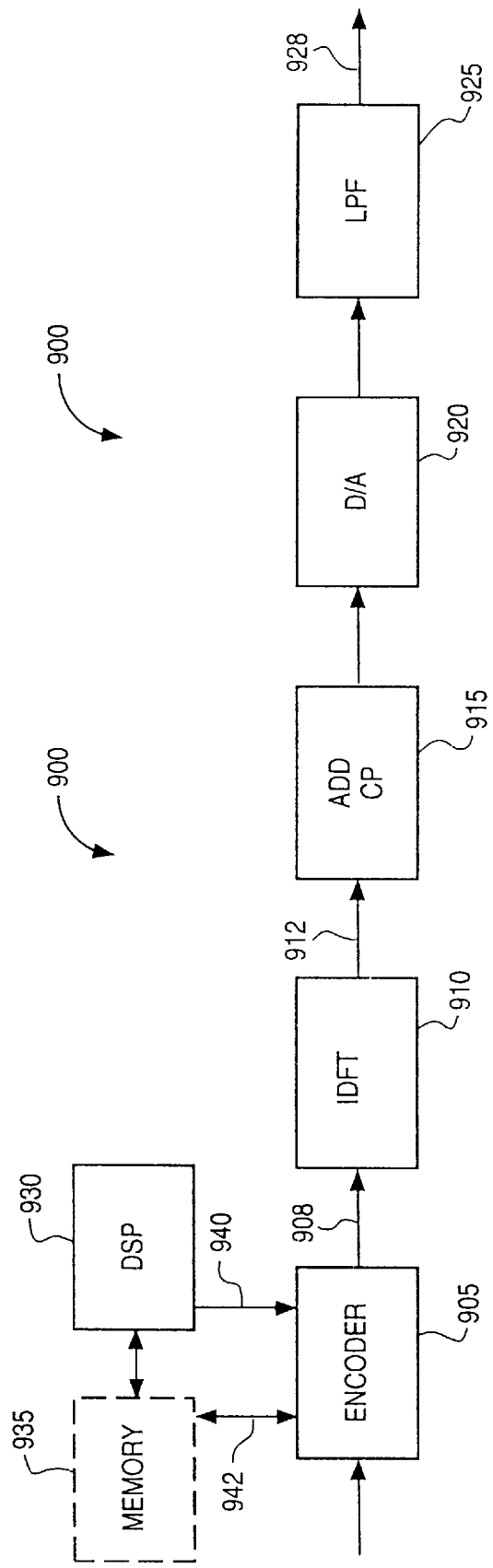
FIG. 20 illustrates one embodiment for a transmitter at a remote unit for transmitting the ATS signal according to the present invention.

The transmitter 900 of FIG. 20 includes an encoder 905, an inverse discrete Fourier transform 910, a block for adding cyclic prefixes 915, a digital to analog converter 920, a low-pass filter 925, a digital signal processor 930 and an optional memory segment 935. The memory 935 may store a sequence of bits defining all, or portions of the ATS signal format, such as in a look-up table. Alternatively, the DSP 930 may generate the bit values associated with the ATS signal according to a preprogrammed software routine which is activated each time the RSU 30 wishes to register with the network. The data bits stored in memory 935 or generated by DSP 930 are provided to the encoder 905 via one of buses 940 and/or 942. The bits correspond to the symbols that form the establishment segment 710, the data segment 715 and the termination segment 720 of the ATS signal. The encoder 905 receives the bit values for the ATS signal from one of the memory 935 and DSP 930 and divides the data bits into groups. The encoder 905 maps each group to a point within a constellation (FIG. 3) to obtain a symbol, having a given phase and amplitude.

Optionally, the phase and amplitude values for the symbols of the ATS signal follow the format explained above in connection with FIGS. 15A and 15B. The amplitude and phase information for each symbol is provided to the inverse discreet Fourier transform (IDFT) 910 via line 908. The IDFT 910 converts the amplitude and phase information from the frequency domain to the time domain to produce a time domain signal at output 912. For instance, the amplitude and phase received upon line 908 for a symbol may be converted by the IDFT 910 to a sinusoidal signal output upon line 912. The sinusoidal signal may have an amplitude defined by the amplitude input at line 908. The sinusoidal signal on line 912 is passed to a cyclic prefix adder 915 which adds a cyclic prefix to the beginning and/or end of each sinusoidal signal produced by the IDFT 910 for a given symbol. The cyclic prefix may represent a partially sinusoidal signal based in part on the sinusoidal signal generated by the IDFT 910. By adding the CP signal to the time domain output of the IDFT 910, the CP adder 915 reduces inter-symbol interference. The output of the CP adder 915 is passed to a digital-to-analog converter 920 where it is converted to an analog signal and passed through a low-pass filter 925 onto the output transmission line 928 and ultimately transmitted to the head end unit 25.

During registration, the encoder 905 of the unregistered RSU 30 may set the bit values for all upstream bins to zero, except for the bits within the UMAC bin. Thus, all of the bins (except for the UMAC bin) are encoded with zero amplitude and zero phase information. As shown in FIG. 15A, the encoder 305 slowly changes the amplitude of the symbols transmitted over the UMAC bin by ramping up the amplitude. Next, the encoder 905 slowly changes the phase of the symbols as defined in FIG. 15B. Consequently, at the begin of a registration sequence, the unregistered RSU 30 outputs, on output line 928, a sinusoidal signal corresponding to symbols of zero amplitude and zero phase in the bins adjacent to the UMAC bin. The initial sinusoidal signal transmitted in the UMAC bin are associated with the beginning of the ramp-up period 725 and thus have low amplitude and constant phase. Subsequent sinusoidal signals transmitted in the UMAC bin are associated with subsequent portions of the ATS signal and thus are output at slightly greater amplitudes. The amplitude of the output sinusoidal signal in the UMAC bin is increased gradually until reaching $V_{RMS}$, which corresponds to the transition or knee-point 770 (FIG. 15A). Thereafter, the encoder 905 generates phase and amplitude information such that consecutive sinusoidal signals for each symbol may have a predetermined amplitude and phase, preferably constant, throughout the hold-time period 730. Next, the encoder 905 generates phase and amplitude information such that the sinusoidal signals for each symbol varies to produce registration data within the data segment 715. The encoder 905 then produces phase and amplitude information to direct the IDFT 910 to produce consecutive sinusoidal signals that decrease in amplitude in accordance with a ramp-down period 740.

Alternatively, the transmitter 900 may be removed and the transmitter 300 (FIG. 9), the transmitting circuitry 350 (FIG. 10) or the circuitry of FIG. 11 may be substituted therefor. The transmitter 350 of FIG. 10 operates in the manner as described above, except that the input bit values to the encoder 365 are supplied from either memory 367 or a digital signal processor 369. Optionally, the memory 367 may contain a lookup table containing bit values defining the ATS signal in accordance with the format of FIGS. 15A and 15B. Alternatively, the DSP 369 may generate the bit values associated with the ATS signal according to a preprogrammed software routine which is activated each time the RSU 30 wishes to register with the network.

The RSUs 30 may employ various modulation methods for transmitting data bits over the UMAC channel provide the modulation method affords sufficiently narrow bandwidth. Optionally, the RSU 30 may transmit data bits over the data segment 715 utilizing a binary discrete phase modulation (DPM) technique. The RSU 30 may implement the DPM utilizing a frequency shaping pulse commonly known as a 1-REC (for rectangular). Alternatively, the remote may transmit ATS signals utilizing other forms of continuous phase modulation (CPM). DPM signals are digital and the phase modulation, rather than being continuous throughout a symbol block occur as jumps in phase at discrete points in time. The DPM signal affords phase modulation by incrementing the phase at discrete points in time. In this manner, the RSU 30 transmits over the UMAC channel a DPM1-REC frequency shaping pulse as a digital signal which corresponds to samples of a scaled CPM 1-REC pulse which may be "zero stuffed" in the appropriate manner.

Next, an exemplary implementation for the time domain DPM transmission is described in accordance with FIG. 10. Optionally, the RSUs 30 may create ATS signals in the time domain, thereby allowing the use of efficient and low cost OFDM transmitters in the RSUs 30. By way of example only, the number of samples in a symbol may equal 550, which includes 38 samples in the cyclic prefix (CP) and 512 samples of data which are converted from the time domain to the frequency domain by an FFT implemented at the head end unit 25. Optionally, the RSU 30 may contain a sign wave table storing a number of samples equal to the number of data samples in the FFT of the head end unit 25. Thus, in the foregoing example, if 512 samples are implemented in the FFT, then the sign wave table may store 512 samples. This example affords a phase granularity of $2_\pi/512$ radians, or approximately 0.703°. The RSU 30 may include a ROM lookup table 405 (FIG. 10) which is addressed to produce unmodulated carrier signals. The ROM lookup table 405 produces a carrier signal at the desired bin frequency based upon the address input. For instance, to obtain a bin frequency of $\mu=113$, the address modifier 400 increments the ROM lookup table 405 address with increments equal to the bin frequency $\mu$. The output of the ROM LUT 405 corresponds to an unmodulated time domain signal at the UMAC bin carrier frequency $\mu$. The RSU 30 slowly and linearly increases/decreases the phase of the data segment 715 over a predetermined number of symbols to transmit data bits. Optionally, the symbols may be subdivided to include four-phase changes per symbol, with the phase changes occurring at four equally spaced sample locations within a symbol (e.g., 0, 138, 276 and 414 samples). The four equal spaced sample locations may be referred to as quarter symbol boundaries. Each phase change during a bit transmission may be identical. A DSP 369 may perform bit changes by adding/subtracting one at line 371 at the accumulator 390 to the current sign table lookup address in the ROM 405. Adding or subtracting one to the current sign table lookup address corresponds to increasing or decreasing, respectively, the phase by an amount equal to the smallest possible phase increment (0.703° in the above example). Optionally, the amplitude of the symbols throughout the data segment 715 may be held constant at a value $V_{RMS}$.

As an example, when the RSU 30 transmits a data bit value of one, the phase of the symbols may be increased by the DSP 369 at each quarter symbol boundary of each symbol in a symbol 735. In the foregoing example, increasing the phase at each quarter symbol boundary throughout a symbol block corresponds to an aggregate phase increase of $0.703 \times 4 \times L_B$ over $L_B$ symbols. In other words if the number of symbols per block $L_B=10$ symbols, this yields an aggregate phase increase of 28°. When the RSU transmits a 0 data bit value, the phase of the data segment 715 may be decreased by the DSP 369 at each quarter symbol boundary of each symbol within a symbol block. With reference to FIG. 15B, in data segment 715, a data bit value of 0 is transmitted during symbol block 775, while data bit values of one are transmitted during symbol block 780–790.

Next, the discussion turns to the operation of the head end unit 25 in processing an incoming upstream asynchronous transmission sequence received over a UMAC channel.

Figure 16:
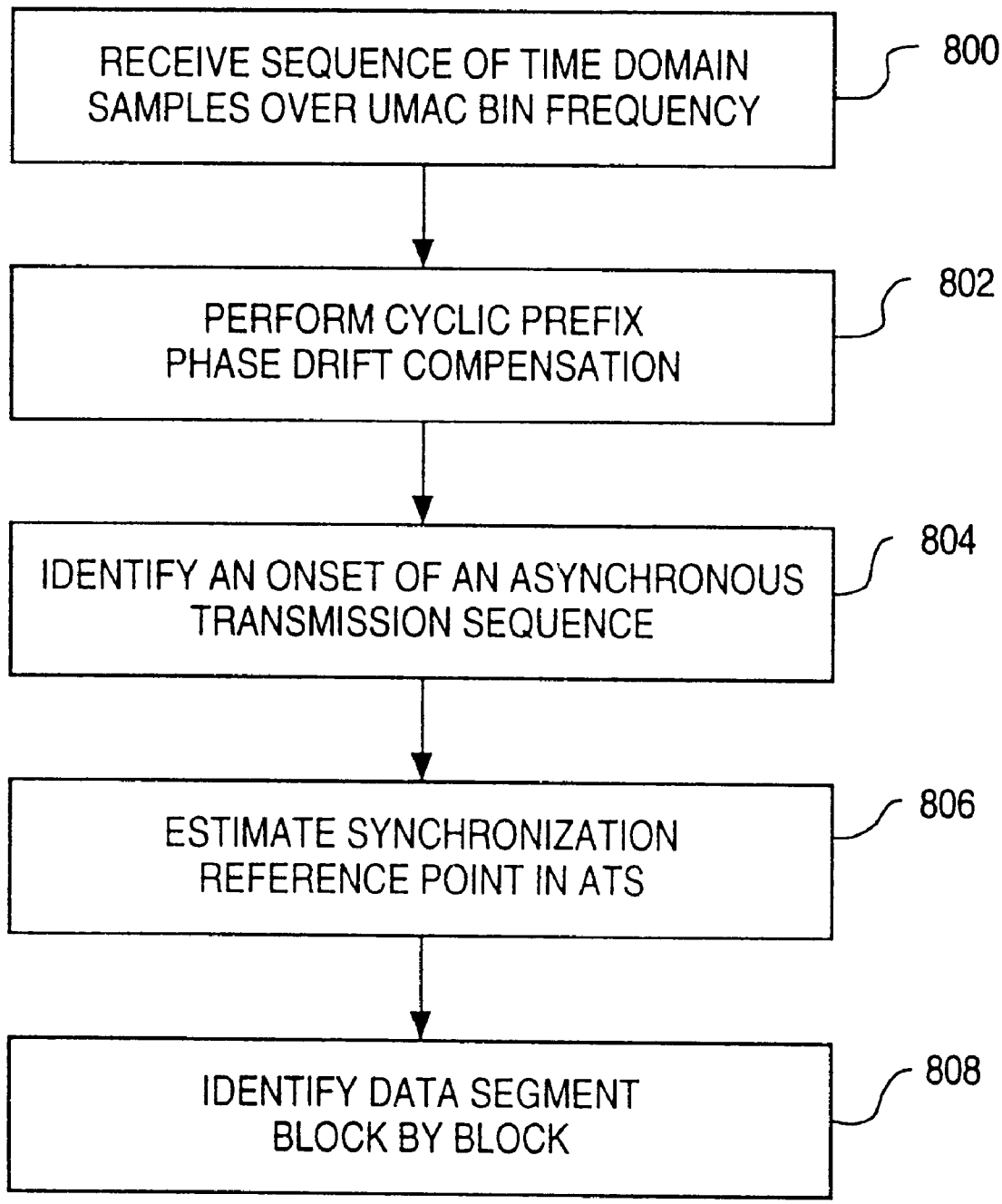
FIG. 16 illustrates a flow chart of a method, by which the head end unit acquires a registration request from a remote unit, according to one embodiment of the present invention.

FIG. 16 illustrates the processing sequence carried out by the head end unit 25 in connection with receiving ATS signals and decoding data segments therein. Initially, at step 800, the head end unit 25 receives a sequence of time domain samples over the UMAC and other channels . The sequence of time domain samples includes the ATS signal transmitted from an RSU 30. The ATS signal includes symbols which are out of alignment with symbols receive by the head end unit 25 from other RSUs 30. Next, the head end unit 25 may perform a cyclic prefix phase drift compensation operation in order to remove the effects of CP phase drift at step 802 (as explained in more detail below). Optionally, steps 800 and 802 may be continuously performed on a symbol by symbol basis at the head end unit while performing steps 804, 806 and 808 as explained below. At step 804, the head end unit identifies the onset of an ATS signal based on a power level of symbols received within the sequence of time domain samples in the UMAC channel. Upon recognizing the onset of an ATS signal, the head end unit 25 may transmit a UMAC channel busy indicator downstream to all RSUs in order to prevent other RSUs from initiating an ATS sequence. The other RSUs do not initiate an ATS sequence until the busy indicator is turned off. The busy indicator is turned off at the end of the current ATS transmission. The identification operation is carried out in the preferred embodiment by monitoring the power level of the ATS signal (as described below in more detail). At step 806, the head end unit 25 estimates the synchronization reference or transition point 770 (FIG. 15A) based on the power of symbols received in the ATS signal. Once the initial synchronization reference point 770 is identified, the head end unit 25 identifies the block boundaries within the ATS signal and begins demodulating the data segment block by block.

Next, a model used by the head end unit 25 is described for symbols received in the ATS signal, along with noise associated therewith. In the following model, the head end unit 25 assumes that real zero-mean additive white gaussian noise (AWGN) exists in the time domain received samples. Let $r_{k+iN}$ correspond to the time-domain received samples at the head end unit 25, where, k=1, . . . , N−1, is the per symbol-period sample counter, and i=0, 1, 2, . . . , is the symbol-period counter. Let $\mu$ denote the UMAC bin number. Then, the ith received UMAC symbol, $R_i$, at the head end unit 25 is obtained by taking the $\mu$th component (bin) of the FFT of the ith block of N time-domain receive data samples. That is, $$R_i = \sum_{k=0}^{n-1} r_{k+iN} e^{-j\frac{2\pi}{N}k\mu}, \; i = 0, 1, 2 \ldots, \quad (1)$$

where the index i counts the receive UMAC symbols (i.e. the ith symbol from bin $\mu$). If it is assumed that each of the received time domain samples is the transmitted data sample corrupted by zero-mean AWGN, then the following equation is true: $r_{k+iN} = x_{k+iN} + w_{k+iN}$. The (k+iN)th transmitted signal voltage, $x_{k+iN}$, represents the IFFT of a set of N transmitted frequency domain symbols $X_{l+iN}$, 1=0, 1, . . . , N−1. That is, $$x_{k+iN} = \frac{1}{N}\sum_{l=0}^{N-1} X_{l+iN} e^{j\frac{2\pi}{N}kl} \quad (2)$$

If equation (2) is substituted into equation (1) using the expression for $r_{k+iN}$ above, and the summations are interchanged, then the following becomes true:

$$R_i = X_i + W_i, \; i=0, 1, 2, \quad (3)$$

where, $$W_i = \sum_{k=0}^{N-1} w_{k+iN} e^{-j\frac{2\pi}{N}k\mu} \quad (4)$$

The value $W_i$ is a weighted sum of real time-domain zero-mean AWGN samples. Thus $W_i$ is a zero-mean complex Gaussian random variable. Let $\sigma^2$ denote the variance of $W_i$. Equation (3) shows that each of the received symbols is equal to the ith RSU transmitted symbol corrupted by complex AWGN.

In a typical OFDM/DMT transmission, the $R_i$ may be random with an unknown distribution. However, the ATS signal transmitted over a UMAC channel retains the structure illustrated in FIGS. 15A and 15B. This ATS signal structure affords a correlation to the received symbol stream $R_i$ at the head end unit 25 during the identification and estimation steps 804 and 806. Therefore, while the received symbols $R_i$ may be random, they have a known distribution. In addition, the form of an ATS signal the received symbol data processed by the head end unit 25 during each operation allows a general parametric description of the received data to be developed. The exact parametric form however varies per head end unit 25 operation.

Returning to FIG. 16, step 802 is described in more detail whereby the head end unit 25 performs cyclic prefix phase drift compensation. The previous discussion of the embodiment of FIGS. 15–20 focused on a description of the ATS signal from a frequency domain point of view. However, when implemented, the RSU 30 may modulate the UMAC carrier wave in the time-domain in order to create the ATS signal. When the modulation is done in the time-domain the incremental phase adjustments of the Discrete Phase Modulation (DPM) transmission can be performed within a symbol period. As a result, of the time-domain DPM scheme, the transmitted signal is continuous across symbol boundaries. However, because of the FFT blocking of the received time-domain signal at the head end unit 25, v=38 samples worth of CP are dropped off each symbol. The symbol-to-symbol discontinuity introduced for FFT processing is entirely predictable and corresponds to a linear drift continuity introduced for FFT processing is entirely predictable and corresponds to a linear drift in the received symbol phase. The CP phase drift may be compensated during head end unit 25 processing.

In order to remove the effects of the CP phase drift on the received symbols, UMAC receive symbols at the head end unit 25 are multiplied by the complex number $e^{-ji\Delta_{v,\mu}}$, or equivalently by $e^{-j(i \bmod N)\Delta_{v,\mu}}$, where N=512 is the size of the FFT used by the head end unit 25 in the present example and $\Delta_{v,\mu}$ is given by $$\Delta_{v\mu} = \left(\frac{2\pi}{512}\right)v\mu.$$

That is, the output of the CP phase drift preprocessing is, $$R'_i = e^{-j(i \bmod N)\Delta_{v,\mu}} R_i \quad (5)$$

This multiplication removes the effects of the CP phase drift, and further processing on the received symbol may take place as usual.

As noted above, ATS signals may occur randomly. Hence, the head end unit 25 continuously monitors signal power on the UMAC channel. The head end unit 25 may utilize a decision statistic to monitor the power of the UMAC channel and to identify ramp-up periods 725 in ATS signals. To carry out a decision statistic, the head end 25 unit repeatedly collects a window of received symbols over the UMAC channel and calculates a power level associated therewith. The power level is then compared to a predetermined positive threshold η. When the magnitude of the power based decision statistic exceeds the threshold, the head end unit 25 identifies the window of received symbols to contain the beginning of an ATS signal. The head end unit 25 may utilize different algorithms for computing the power based decision statistic. Also, the head end unit 25 may compare the detected power level with different thresholds, which may be also referred to as the ramp detector threshold. Different thresholds have correspondingly different probabilities that the head end unit 25 will falsely detect a ramp-up as occurring.

More specifically, the head end unit 25 may use the following ramp-detector statistic that is computed every symbol:

$$l_k(R) = \sum_{i=0}^{M-1} |R_{k-i}|^2 \qquad (6)$$

where k indexes the current symbol, and $|R_{k-i}|^2 = R_{k-i} R^*_{k-i}$ is the magnitude squared of the ith prior received symbol. Thus, the head end unit 25 may use the decision statistic to compute the aggregate received symbol power over the past M received symbols.

Each of the received symbols $R_i$ may be corrupted by zero-mean complex AWGN as in equation (3). Thus, the power-based decision statistic in equation (6) is distributed as a chi-square random variable with M complex degrees of freedom. Therefore, if the maximum average transmit power at the RSU 30 is $P_{av} = V^2_{rms}$ and if the desired signal-to-noise ratio is in decibels, the probability of false alarm PF of ramp detection is given as a function to the threshold η by, $$P_F = \exp\left(-\frac{\eta}{P_{av}} \cdot 10^{(SNR_{dB})/10}\right) \sum_{k=0}^{M-1} \frac{\left(\frac{\eta}{P_{av}} \cdot 10^{(SNR_{dB})/10}\right)^k}{k!}. \qquad (7)$$

Equation (7) allows the probability of a false alarm $P_F$ to be calculated for a given worst-case $SNR_{dB}$, a given order M of the decision statistic. As an example, consider the case where $SNR_{dB}=10$ dB, M=8, and $\eta=4P_{av}$. Such a case gives a ramp-detect false alarm probability of $P_F=10^{-10}$, predicted by equation (7).

After identifying the onset of an ATS signal as described in the previous section, the head end unit 25 estimates the ATS signal knee or transition location 770. By identifying the transition point 770, the head end unit 25 locates, as closely as possible, the block boundaries within the particular ATS signal. Thus, the head end unit 25 performs bit-time synchronization to the RSU 30 based on the transition point 770. The ATS signal hold-time period 730 affords the head end unit 25 time to identify transition point 770.

Once a ramp-up amplitude 750 is detected, the head end unit 25 immediately begins the transition point or knee estimation by collecting a window of P received symbols. The software or hardware that performs this estimation may be referred to as the knee-estimator. The received window will generally include the previous M received symbols collected by the head end unit 25 for computation of the last power decision statistic. In addition, the window will include $L_R$ new received symbols. Thus, overall a window length of $P=M+L_R$ symbols is collected by the head end unit 25. The head end unit 25 collects $L_R$ new received symbols in the length P data window to take into consideration the possibility that the ramp-detector crossed the threshold very early-on in the ramp-up period 725. In such a case, the transition point or knee location would occur very late in the received data window, the length $P=M+L_R$ of the received data window takes into account the worst-case scenario of early ramp detection.

For the following example, it is assumed that the window of P received symbols contains a transition point 770 (i.e. no false-alarm by the ramp-detector has occurred), and that the noise model in equation (3) applies to the received symbol stream. Optionally, the head end unit 25 may use a Maximum-Likelihood (ML) estimator to identify the transition point or the knee location 770. The ML estimator may be equivalent to a best least-squares fit of the P received symbols to one of a set of knee test-functions. This is because the received symbol data is Gaussian, and the log-likelihood function arrived at while developing the ML estimator takes the same functional form as the one which must be minimized to find the knee test-function yielding the best least square fit.

Figure 17:
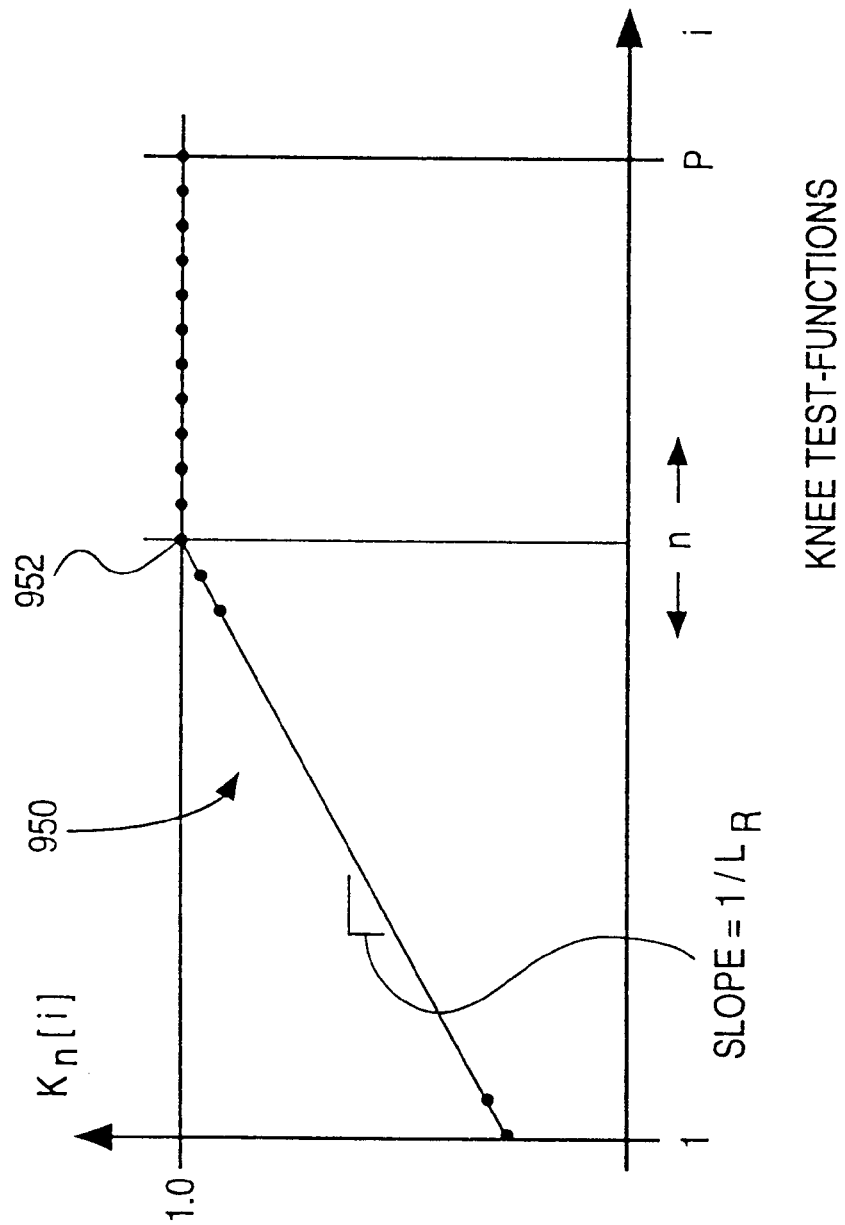
FIG. 17 illustrates an exemplary format for a leading segment of an ATS signal according to one embodiment of the present invention.

As it is assumed that the window contains a transition point 770, the received symbol equation (3), may be rewritten in the following parametric form, $$R_i = aK_n[i] + W_i, \; i=1, 2, \ldots, P, \qquad (8)$$

where $K_n[i]$ is the nth knee test-function, $n=1, 2, 3, \ldots, P-2$, and the parameter a is a complex scale factor. The scale factor a scales and rotates the (real) knee test-function in the complex plane. The function $K_n[i]$ is defined only in a window $i \in \{1, P-1\}$, and undefined elsewhere. The index n indicates the location of the knee within the length P window. The knee test-function may be described mathematically with the aid of the ramp-function $\psi_n[k]$ such that, $$K_n[i] = \begin{cases} \Psi_n[i-1], & i=1, 2, \ldots, P, \\ \text{undefined elsewhere} \end{cases} \qquad (9)$$

where $$\Psi_n[k] = \begin{cases} 0, & \infty < k < n - L_R \\ \frac{k + (L_R - n)}{L_R}, & n - L_R \leq k \leq n \\ 1, & n < k < \infty \end{cases} \qquad (10)$$

is defined for all k. Although the $\{K_n[i]\}$ are precisely described above, they are most easily understood by considering FIG. 17. FIG. 17 illustrates an exemplary nth knee test-function which may be simply a ramp 950 with its knee 952 placed at location n within a length P window. For all i<n the knee test-function slopes back with a slope $1/L_R$, and for i≧n the function has value 1.

Placing the elements $R_i$, $W_i$, and $K_n[i]$, for $1 \leq i \leq P$, into the P×1 vectors R, W, and $K_n$ respectively, gives the vector received symbol data model.

$$R = aK_n + W, \qquad (11)$$

Where in equation (11), W is distributed $N(0, \sigma_w^2 I)$ and thus R is distributed $N(aK_n, \sigma_w^2 I)$. It should be noted that R is parameterized by scale factor a and knee location n. The variables $\hat{a}_{ML}$ and $\hat{n}_{ML}$ denote the maximum likelihood estimates of the scale factor and knee location parameters, respectively, The ML estimates can be found by simultaneously maximizing the log-likelihood function of the received data in equation (11) for both a and n. The log-likelihood function of the received data is, $$l(R;a,n) = ln[p(R;a,n)] \quad (12)$$

$$= -\ln \det(\sigma_w^2 I) - \frac{1}{\sigma_w^2}(R - aK_n)^\dagger (R - aK_n). \quad (13)$$

This may be further simplified by eliminating multipliers and constant terms which are not a function of a or n to yield, $$l'(R;a,n) = (R - aK_n)^\dagger (R - aK_n) \quad (14)$$

which must now be minimized to find the ML parameters for a and n. It is easily observed that the form of the log-likelihood function in equation (14) is identical to the Mean Square Error (MSE) objective function that must be minimized for both a and n in the case of finding the best least-squares fit parameters of the received symbol data to the knee test-functions. Thus both the ML and least-squares fit (i.e. MMSE) derived estimators are substantially identical. Taking the derivative of equation (14) with respect to the complex parameter a, setting it to zero and solving yields, $$\hat{a}_{ML}(n) = \frac{K_n^T R}{K_n^T K_n}, \quad (15)$$

where $\hat{a}_{ML}(n)$ is the ML estimate of a, still as a function of n. Thus, substituting this expression for $\hat{a}_{ML}(n)$ back into equation (14), the ML estimate of the knee location may be solved. Alternatively, since there are only a finite number of locations (i.e. n=1, 2, . . . , P−1) at which the knee might possibly be found, the ML estimate for n may easily be obtained by the head end unit 25 through comparison of equation (14) for all possible knee test-functions $K_n$.

Figure 18:
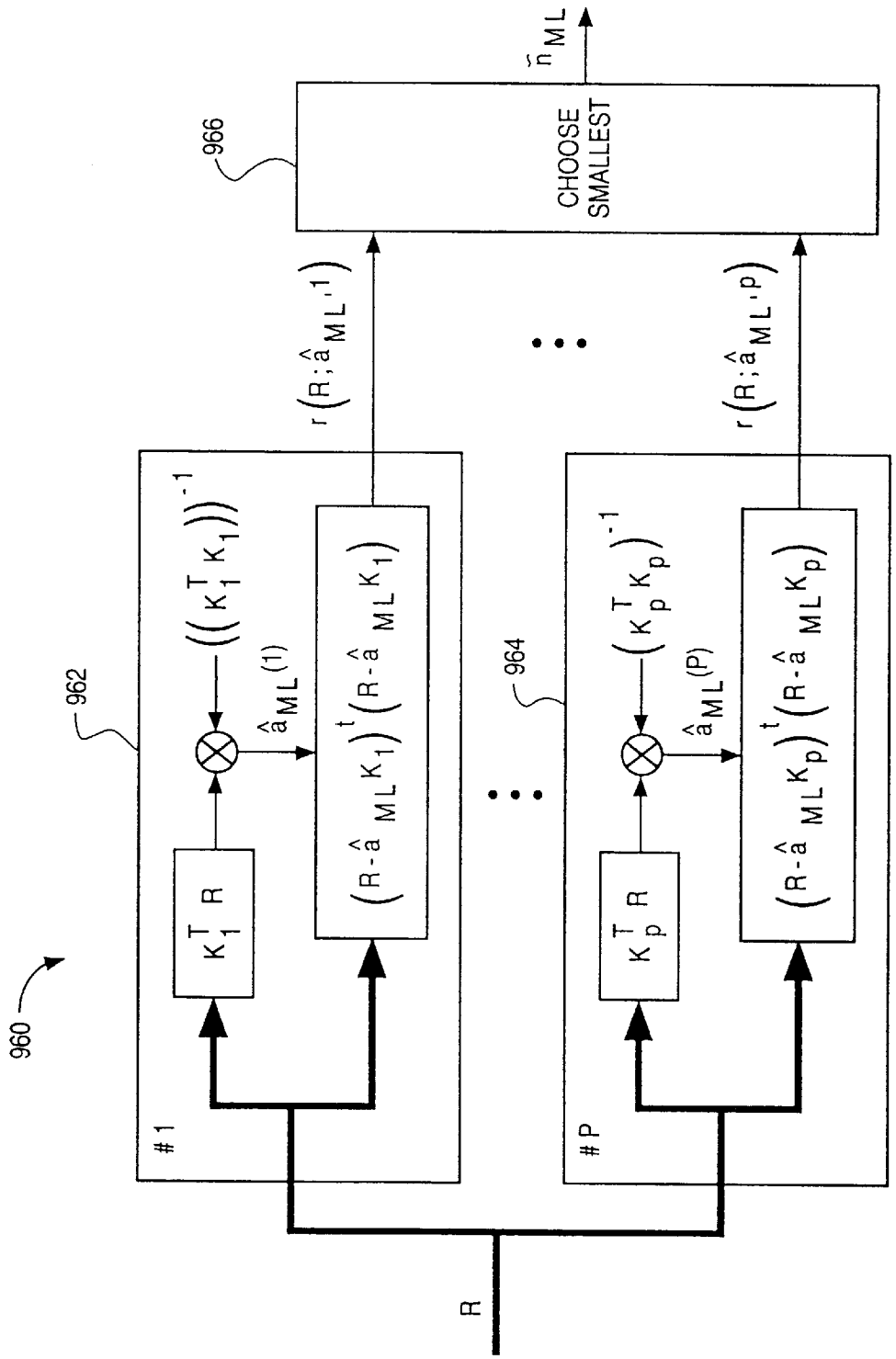
FIG. 18 illustrates a block diagram of one embodiment for a knee-estimation processor of the head end unit to identify the transition point for synchronizing to the ATS signal according to the present invention.

FIG. 18 illustrates a block diagram of one embodiment for the knee-estimator 960 in the head end unit 25. While the knee-estimator 960 depicted in FIG. 18 indicates a possible hardware implementation, the knee-estimator 960 in the head end unit 25 may also be implemented in software. The knee-estimator 960 includes a plurality of knee-estimation function blocks 962–964. Each knee-estimation function block 962–964 receives a window of P symbols from the ATS signal. The knee-estimation function blocks 962–964 compare the window of P symbols with the knee-test function corresponding to the block 962–964. Each knee-test function block 962–964 produces an output identifying a likelihood that the knee or transition point 770 (FIG. 15A) corresponds to the knee-location N associated with that particular function block. Processor 966 chooses the knee-test function block 962–964 having the maximum likelihood output therefrom (e.g., the block 962–964 that most likely contains the knee-location N that corresponds to the received set of symbols). In this manner, the head end unit 25 identifies the transition point 770 within an ATS signal.

Once the knee estimator 960 estimates the ATS signal knee location, it is able to identify the block boundaries 752 within the ATS signal. The head end unit 25 next begins to demodulate the data-bits that are encoded in the received ATS signal. The head end unit 25 utilizes a block-by-block coherent Maximum Likelihood (ML) decoder 980 as described below and illustrated in FIG. 19. Immediately upon completing the knee estimation, the head end unit 25 begins demodulating the data-bits contained in the received ATS signal stream by collecting and processing windows of $L_B$ symbols (i.e. one block) at a time. Once the head end unit 25 estimates the ATS signal knee location 770, it has achieved basic block synchronization with the unregistered RSU 30. The noise model in equation (3) is applied by the head end unit 25 to the ATS signal. Therefore, the first block of $L_B$ symbols that the head end unit 25 processes, begins $L_H$ symbols after the transition point 770. Thereafter, the number of symbols to be processed by the demodulator, begin at symbol locations $nL_B$, n=1, 2, 3, . . . , with respect to the beginning of the first block. With the location of these blocks established in the received ATS signal, a single, arbitrary, window (i.e. block) of received symbols is examined.

As noted above, the information bits at the RSU may be differentially phase modulated over the $L_B$ symbols in a block of the data segment 715. By way of example, the phase may be linearly increased by $\delta = (2\pi/512)(4)$ radians-per-symbol when transmitting a 1, and decreased linearly by $-\delta$ radians-per-symbol when transmitting a 0. For purposes of this explanation, the bit test-function $B_0[i]$ corresponds to the sequence of transmitted symbols, normalized to the unit-circle, that would result from the RSU transmitting a 0 in the case that the first symbol of the block had a phase of zero radians (i.e. no initial phase offset). The bit test-function $B_1[i]$ is defined similarly. That is, $$B_m[i] = \begin{cases} e^{j(2m-1)(i-1)\delta}, & i = 1, 2, \ldots, L_B, \\ \text{undefined elsewhere} \end{cases} \quad (16)$$

for m=0, 1. The bit test-vectors $B_0$ and $B_1$ represent the $L_B \times 1$ vectors having $B_0[i]$ and $B_1[i]$, i=1, 2, . . . , $L_B$, as their elements, respectively. Likewise the received symbols, $R_i$, i=1, 2, . . . , are placed in the $L_B \times 1$ vector R. Once the head end unit achieves block synchronization with the RSU, the block of received symbol data may be expressed parametrically in following vector form, $$R = cB_m = W, \quad (17)$$

Where in equation (17), c is a complex scale factor, $B_m$ is the mth bit test-vector, and W is the $N(0, \sigma_w^2 I)$ distributed complex AWGN vector. The parameter c serves to scale and rotate, in the complex plane, each of the elements of the bit test-vector by the same amount. Therefore through this scaling operation any received symbol block in the absence of noise, may be exactly represented by the appropriate bit test-vector. For each symbol block, the head end unit 25 will find a Maximum Likelihood (ML) estimate of the value of the complex scale factor c in equation (17). In essence, the complex parameter c is an estimate of the first data point in the received block, and as a result, it embodies an estimate of the phase of that first data point. Hence the head end unit 25 may perform what is know as coherent demodulation on a block-by-block basis. In addition to the estimate of c, an ML estimate for the transmitted bit test-vector will be found, and hence of the bit transmitted.

The variables $\hat{c}_{ML}$ and $\hat{m}_{ML}$ denote the ML estimates of c and m respectively, where m is the index of the bit test-function. Thus $\hat{m}_{ML}$ corresponds to the ML estimate of the bit sent during the receive symbol-block in question. The ML estimates may be found by simultaneously maximizing the log-likelihood function of the received data in equation (17) for both c and m. Following the derivation of equation (14) in the previous section, everywhere replacing a by c and K by $B_m$, the following log-likelihood is provided for the block of received data, $$l'(R;c,m) = (R - cB_m)^\dagger (R - cB_m) \quad (18)$$

which must now be minimized to find the ML estimators for c and m. Taking the derivative of equation of (18) with respect to the complex parameter c, setting it to zero and solving yields, $$\hat{c}_{ML}[m] = \frac{B_m^\dagger R}{B_m^\dagger B_m}, \quad (19)$$

where $\hat{c}_{ML}[m]$ is the ML estimate of c as a function of the bit function m, and $B^\dagger{}_m$ denotes the Hermetian transpose of $B_m$. Equation (18) could be formally minimized by substituting back in with the expression of $\hat{c}_{ML}[m]$, but this is unnecessary. Since there are only two possibilities for $B_m$, the ML estimate both $\hat{c}_{ML}[0]$ and $\hat{c}_{ML}[1]$ are substituted individually into equation (19), using $B_0$ and $B_1$ respectively, and find the one which yields the smallest result. The one that does, corresponds to the value of m that is the ML estimate.

Figure 19:
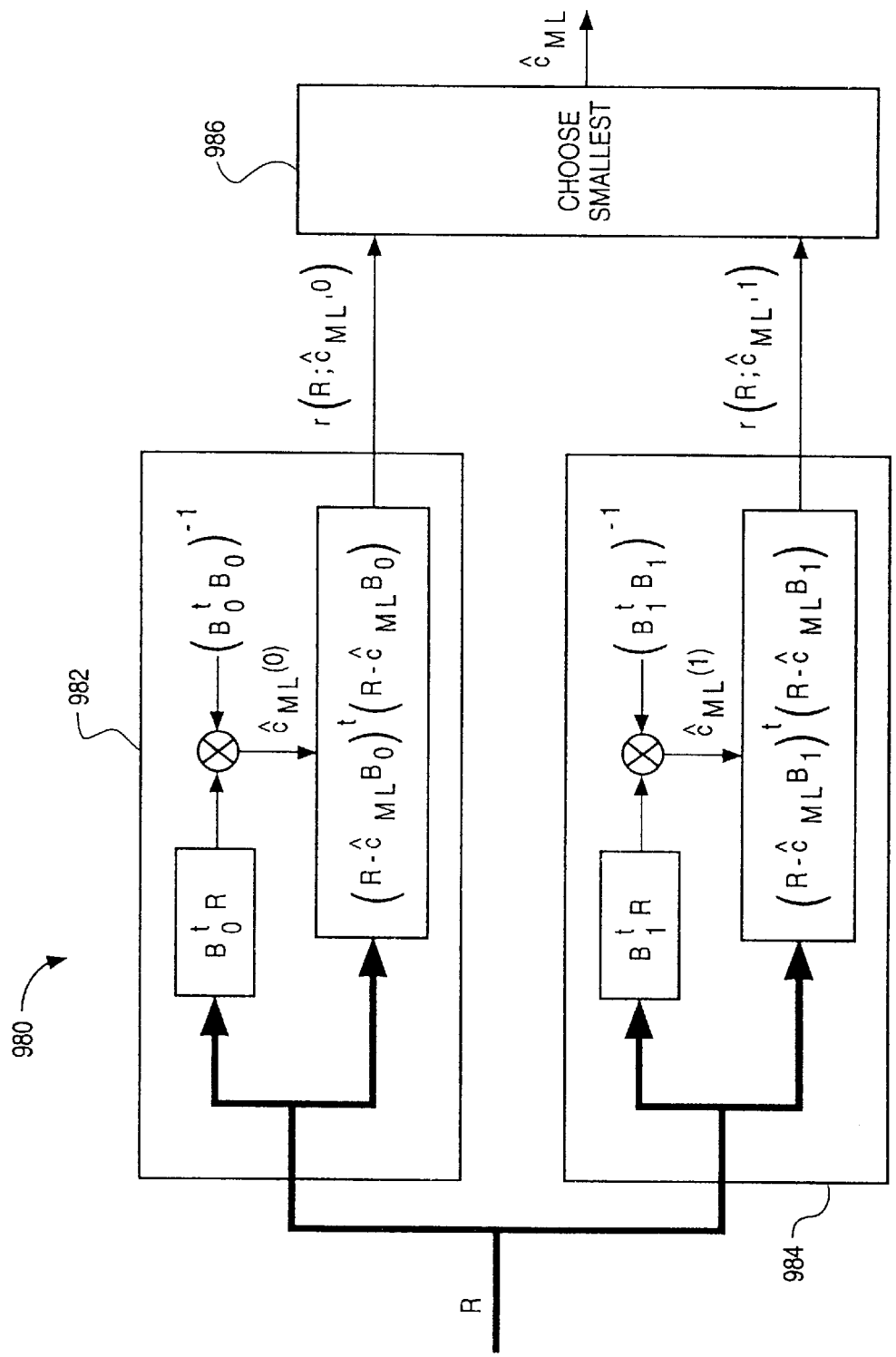
FIG. 19 illustrates a block diagram of one embodiment for a decoder at the head end unit that decodes symbol blocks within the ATS signal transmitted by a remote unit according to one embodiment of the present invention.

FIG. 19 illustrates the processing hardware of a decoder 980 of the head end unit 25 that performs the block-by-block decoding. While the structure shown in FIG. 19 indicates a possible hardware implementation, alternatively the decoder may be implemented in software. The decoder 980 includes multiple block-to-block processing units 982–984 for processing the ATS signal as explained above. Function 986 reviews the outputs of the block-to-block decoder 982–984 and identifies the block which yields the smallest result, thereby identifying the block which most likely locates the beginning of a symbol block to be decoded.

The head end unit 25 need not perform FEQ operations on the UMAC bin in order to correctly decode the ATS signal. This is due to the differential and constant envelope nature of the DPM data-bit encoding scheme.

Optionally, the fact that the present system can be designed to transmit and receive either 4 point constellations or 16 point constellations in a given bin depending on the signal-to-noise ratio in the communications system at the bin frequency. This determination is made by the head end unit 25 and the remote service unit(s) 30 transmitting and/or receiving in that bin are instructed accordingly. In bins having a low signal-to-noise ratio, it is preferable to use 4 point constellations. In bins having a high signal-to-noise ratio, it is preferable to use 16 point constellations.

With the foregoing in mind, it can be seen why the embodiments of the remote service units 30 described herein send and receive data in nine bins, respectively. In high noise conditions, four bins are needed by each of the two phones at a customer site to transmit data and four bins are needed by each of the two phones at the customer site to receive data. A total of eight bins are thus required in high nose conditions for each telephone remote and transmitter, respectively. The further ninth bin may, for example, be used to facilitate a bin swapping function.

Although the present invention has been described with reference to specific embodiments, those of skill in the art will recognize that changes may be made thereto without departing from the scope and spirit of the invention as set forth in the appended claims.

What is claimed is:

1. A method of establishing an up-stream multi-access (UMAC) channel, in a multi-point communications system, from one of a plurality of remote service unit transmitters to a primary site receiver, the primary site receiver being disposed at a primary site and the remote service unit transmitters being disposed at a plurality of respective secondary sites, the method comprising:

receiving, at the primary site, an asynchronous transmission sequence (ATS) signal transmitted from a remote service unit (RSU), said ATS signal comprising symbols out of alignment with the primary site, each symbol having a phase, a power level and an amplitude, said symbols being grouped into blocks, said blocks being segmented to form an establishment segment and a data segment in the ATS signal;

identifying the onset of the ATS signal based on at least one of the amplitude, power level and phase of symbols received by the primary site in the upstream multi-access (UMAC) channel;

estimating a synchronization reference point within the received ATS signal based on at least one of the amplitude, power level and phase of symbols received by the primary site;

identifying a first block within the data segment based on said synchronization reference point; and demodulate data within each block of the data segment beginning with said first block.

2. The method of claim 1, said identifying step further comprising:

continuously monitoring at least one of symbol amplitude, power and phase of the UMAC channel; and computing at least one of aggregate symbol amplitude, power and phase for a predetermined number of received symbols;

comparing at least one of aggregate symbol amplitude, power and phrase to a threshold; and determining that the ATS signal is being transmitted over the UMAC channel when at least one of aggregate symbol amplitude, power and phase exceeds said threshold.

3. The method of claim 1, wherein said identifying step includes computing a power-based decision statistic for every symbol received over the UMAC channel.

4. The method of claim 1, further comprising the step of ramping-up the power level of symbols within said establishment segment to indicate a beginning of the ATS signal, said identifying step detecting the ramping-up of the power level.

5. The method of claim 1, wherein said establishment segment includes a ramp-up period including multiple symbols, an amplitude of said multiple symbols increasing with time over a duration of said ramp-up period.

6. The method of claim 5, wherein said establishment segment includes a hold-time period including multiple symbols, an amplitude of said multiple symbols remaining constant with time over a duration of said hold-time period.

7. The method of claim 1, said estimating step further comprising:

collecting a predetermined number of received symbols as a received data window;

examining said number of symbols in said received data window to develop a maximum-likelihood estimate of said synchronization reference point, the maximum likelihood estimate representing the point in the establishment segment most likely to constitute the synchronization reference point.

8. The method of claim 1, wherein said estimating step includes comparing a predetermined number of received symbols in said establishment segment to a plurality of test functions, said test functions corresponding to different locations for said synchronization reference point within said establishment segment.

9. The method of claim 1, wherein said estimating step includes identifying a best match between a least-squares estimate of a window of symbols in said establishment segment and a set of test functions.

10. The method of claim 1, wherein said method further comprises transmitting said ATS signal from a remote service unit over a UMAC channel having a narrow bandwidth relative to a bandwidth of upstream synchronized data channels carrying synchronized communications data.

11. The method of claim 1, wherein said receiving step receives said ATS signal from an OFDM/DMT communication network.

12. An asynchronous transmission sequence (ATS) signal for transmission in a multipoint-to-point communications network having a primary site and a plurality of remote service units disposed at secondary sites remote from the primary site, said ATS signal comprising:

a plurality of symbols, each of which has a phase and amplitude, said symbols being grouped into symbol blocks, said symbol blocks being segmented to define an establishment segment and a data segment of the ATS signal, said establishment segment containing a synchronization reference point defined by first and second blocks of symbols preceding and following said reference point, respectively, wherein at least one of amplitude and phase for symbols in said first block of symbols are based on a first format with respect to time up to said reference point, and wherein at least one of amplitude and phase for symbols in said second block of symbols are based on a second format with respect to time after said reference point.

13. The ATS signal of claim 11, wherein all symbols in said first and second blocks of symbols have constant phase.

14. The ATS signal of claim 11, wherein the symbols in said first block vary in amplitude in a linear manner, and the symbols in said second block have a constant amplitude.

15. The ATS signal of claim 11, wherein the symbols in the first block increase in amplitude with respect to time and maintain a constant phase.

16. The ATS signal of claim 11, wherein the symbols in the second block maintain constant amplitude and phase.

17. The ATS signal of claim 11, wherein the first and second formats are linear with respect to time.

18. The ATS signal of claim 11, wherein the establishment segment includes a ramp-up period followed by a hold-time period, symbols in said ramp-up period increasing in amplitude with respect to time, symbols in said hold-time period maintaining a constant amplitude.

19. The ATS signal of claim 11, wherein said reference point corresponds to a beginning of a block of symbols.

20. The ATS signal of claim 12, wherein said ATS signal is transmitted over an OFDM/DMT network.

21. A remote service unit (RSU) for communicating with a distant primary site via a multipoint-to-point communications network having a plurality of upstream communications channels and at least one upstream multiple access channel (UMAC channel), the RSU requesting registration with the primary site by transmitting a registration request over a preassigned UMAC channel, the registration request being non-symbol aligned with communications signals transmitted over the upstream communications channels from other RSUs, the RSU comprising:

a transmitter for transmitting signals upstream over a UMAC channel, signals transmitted in said UMAC channel including registration requests; and an ATS signal generator for producing an asynchronous transmission sequence (ATS) signal as a registration request, said transmitter transmitting said ATS signal over said UMAC channel to request registration without interfering with communications data being transmitted simultaneously over the upstream communications channels from other RSUs that are orthogonal with respect to one another.

22. The RSU of claim 19, wherein said ATS signal generator produces null signals to be transmitted over all communications channels except said UMAC channel during a registration request.

23. The RSU of claim 19, wherein said ATS signal generator further comprises:

a data bit source for providing a sequence of data bits defining said ATS signal; and an encoder for converting said sequence of data bits to a plurality of symbols forming said ATS signal, said ATS signal being divided into an establishment segment and a data segment; said establishment segment following a predefined format and containing a synchronization reference point.

24. The RSU of claim 19, further comprising memory for storing said ATS signal.

25. The RSU of claim 19, further comprising a digital signal processor for generating said ATS signal.

26. The RSU of claim 19, further comprising an inverse discrete Fourier transform (IDFT) for converting said ATS signal to a sequence of sinusoidal signals to be transmitted by said transmitter.

27. The RSU of claim 19, wherein said ATS signal comprises a predefined sequence of symbols, said RSU further comprising a cyclic prefix adder for adding a cyclic prefix to each symbol.

28. The RSU of claim 19, wherein said transmitter transmits said ATS signal over a UMAC channel having a narrow bandwidth with respect to a bandwidth of a single communications channel.

29. The RSU of claim 19, further comprising a quarter wave sine table for generating said ATS signal.

30. The RSU signal of claim 19, further comprising a sine wave table for generating said ATS signal.

31. The RSU of claim 19, wherein said ATS signal generator divides said ATS signal into an establishment segment and a data segment.

32. The RSU of claim 19, wherein said ATS signal includes an establishment segment that contains symbols having a phase and amplitude, said ATS signal generator dividing said symbols into first and second blocks that follow first and second formats, respectively, for at least one of amplitude and phase, said ATS signal generator defining a synchronization reference point at a point of intersection between said first and second blocks.

33. The ATS signal of claim 30, wherein all symbols in said first and second blocks of symbols have constant phase.

34. The ATS signal of claim 30, wherein the symbols in said first block vary in amplitude in a linear manner, and the symbols in said second block have a constant amplitude.

35. The ATS signal of claim 30, wherein the symbols in the first block increase in amplitude with respect to time and maintain a constant phase.

36. The ATS signal of claim 30, wherein the symbols in the second block maintain constant amplitude and phase.

37. The ATS signal of claim 30, wherein the first and second formats are linear with respect to time.

38. The ATS signal of claim 30, wherein the establishment segment includes a ramp-up period followed by a hold-time period, symbols in said ramp-up period increasing in amplitude with respect to time, symbols in said hold-time period maintaining a constant amplitude.

39. The ATS signal of claim 30, wherein said reference point corresponds to a beginning of a block of symbols.

40. The RSU of claim 21, wherein said RSU communicates via an OFDM/DMT network.

* * * * *